US011290951B2

(12) United States Patent
 Nithiyanantham et al.

(10) Patent No.: US 11,290,951 B2
(45) Date of Patent: Mar. 29, 2022

(54) PROVIDING OPTIMAL PACKET DATA NETWORK GATEWAY SELECTION FOR 5G NETWORK ENVIRONMENTS UPON INITIAL USER EQUIPMENT ATTACHMENT VIA A WIFI EVOLVED PACKET DATA GATEWAY

(71) Applicant: Cisco Technology, Inc., San Jose, CA (US)

(72) Inventors: Shivakumar Nithiyanantham, Bangalore (IN); Mukesh Yadav, Bangalore (IN); Navneet Priya, Bangalore (IN)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/273,792

(22) Filed: Feb. 12, 2019

(65) Prior Publication Data
 US 2020/0260370 A1    Aug. 13, 2020

(51) Int. Cl.
 *H04W 48/00* (2009.01)
 *H04W 8/18* (2009.01)
 (Continued)

(52) U.S. Cl.
 CPC .............. *H04W 48/17* (2013.01); *H04W 8/18* (2013.01); *H04W 8/22* (2013.01); *H04W 36/18* (2013.01); *H04W 88/06* (2013.01)

(58) Field of Classification Search
 CPC ......... H04W 48/17; H04W 8/18; H04W 8/22; H04W 36/18; H04W 88/06
 See application file for complete search history.

(56) References Cited

U.S. PATENT DOCUMENTS

| 7,185,067 B1 * | 2/2007 | Viswanath ............ H04W 28/08 455/453 |
| 9,357,014 B2 | 5/2016 | Shamilian et al. |

(Continued)

FOREIGN PATENT DOCUMENTS

| EP | 3193531 A1 | 7/2017 |
| WO | 2017166252 A1 | 10/2017 |

(Continued)

OTHER PUBLICATIONS

3GPP Organizational Partners,"3rd Generation Partnership Project; Technical Specification Group Services and System Aspects; Architecture enhancements for non-3GPP accesses, (Release 15)", 3GPP TS 23.402 V15.3.0, Mar. 2018, 314 pages.

(Continued)

*Primary Examiner* — Luat Phung
(74) *Attorney, Agent, or Firm* — Edell, Shapiro & Finnan, LLC

(57) ABSTRACT

Techniques that provide optimal packet data network gateway selection upon initial attachment of a upon an initial user equipment (UE) attachment via a WiFi Evolved Packet Data Gateway (ePDG) are described herein. In at least one embodiment, a method may include determining, by an ePDG, whether a UE is capable to connect to at least one of a 5G standalone mobile core network and a 5G non-standalone mobile core network; determining, by the ePDG, whether the UE is subscribed to connect to at least one of the 5G standalone mobile core network and the 5G non-standalone mobile core network; and selecting, by the ePDG, a packet data network gateway to support the UE connection based, at least in part, on determining that the UE is capable and is subscribed to connect to at least one of the 5G standalone mobile core network and the 5G non-standalone mobile core network.

20 Claims, 10 Drawing Sheets

(51) Int. Cl.
*H04W 8/22* (2009.01)
*H04W 36/18* (2009.01)
*H04W 88/06* (2009.01)

(56) References Cited

U.S. PATENT DOCUMENTS

| | | | |
|---|---|---|---|
| 9,374,777 B2 | 6/2016 | Salot et al. | |
| 9,642,077 B2 | 5/2017 | Mathai et al. | |
| 9,749,773 B2 | 8/2017 | Kodaypak et al. | |
| 2010/0080186 A1 | 4/2010 | Guo et al. | |
| 2010/0291943 A1 | 11/2010 | Mihaly et al. | |
| 2010/0296453 A1 | 11/2010 | Grahn et al. | |
| 2012/0110191 A1 | 5/2012 | Johansson | |
| 2013/0258943 A1 | 10/2013 | Madaiah | |
| 2015/0201364 A1* | 7/2015 | Yamada | H04W 28/08 370/235 |
| 2016/0174120 A1 | 6/2016 | Zembutsu et al. | |
| 2016/0192263 A1 | 6/2016 | Zembutsu et al. | |
| 2016/0262144 A1 | 9/2016 | Kitazoe et al. | |
| 2016/0366574 A1* | 12/2016 | Dahan | H04W 76/50 |
| 2017/0208518 A1* | 7/2017 | Shu | H04W 36/12 |
| 2018/0027414 A1* | 1/2018 | Li | H04W 48/08 455/435.1 |
| 2018/0124597 A1* | 5/2018 | Malthankar | H04W 12/069 |
| 2018/0227760 A1* | 8/2018 | Foti | H04L 63/0884 |
| 2018/0288657 A1 | 10/2018 | Stojanovski et al. | |
| 2019/0053328 A1* | 2/2019 | Kunz | H04L 65/1073 |
| 2019/0069226 A1 | 2/2019 | Lee et al. | |
| 2019/0116551 A1* | 4/2019 | Faccin | H04W 76/10 |
| 2019/0268950 A1* | 8/2019 | Youtz | H04W 76/30 |
| 2020/0053047 A1* | 2/2020 | Gambhir-Parekh | H04L 61/2007 |
| 2020/0092941 A1* | 3/2020 | Song | H04L 65/103 |
| 2020/0120550 A1 | 4/2020 | Narayanappa et al. | |

FOREIGN PATENT DOCUMENTS

| | | |
|---|---|---|
| WO | 2018006985 A1 | 1/2018 |
| WO | 2018008980 A1 | 1/2018 |

OTHER PUBLICATIONS

3GPP Organizational Partners, "3rd Generation Partnership Project; Technical Specification Group Services and System Aspects; System Architecture for the 5G System; Stage 2, (Release 15)", 3GPP TS 23.501 V15.3.0, Sep. 2018, 226 pages.

3GPP Organizational Partners, "3rd Generation Partnership Project; Technical Specification Group Services and System Aspects; Procedures for the 5G System; Stage 2, (Release 15)", 3GPP TS 23.502 V15.3.0, Sep. 2018, 330 pages.

3GPP Organizational Partners, "3rd Generation Partnership Project; Technical Specification Group Core Network and Terminals; Non-Access-Stratum (NAS) protocol for Evolved Packet System (EPS); Stage 3, (Release 15)", 3GPP TS 24.301 V15.4.0, Sep. 2018, 530 pages.

3GPP Organizational Partners, 3rd Generation Partnership Project; Technical Specification Group Core Network and Terminals; Domain Name System Procedures; Stage 3, (Release 15), 3GPP TS 29.303 V15.3.0, Sep. 2018, 76 pages.

Mirza Golam Kibria et al., "Next Generation New Radio Small Cell Enhancement: Architectural Options, Functionality and Performance Aspects", interarXiv: 1802.10267v1 [cs.IT], Feb. 28, 2018, 9 pages.

P. Mockapetris, "Domain Names—Concepts and Facilities", Network Working Group, Request for Comments 1034, Obsoletes: RFCs 882, 883, 973, Nov. 1987, 55 pages.

P. Mockapetris, "Domain Names—Implementation and Specification", Network Working Group, Request for Comments: 1035, Obsoletes: RFCs 882, 883, 973, Nov. 1987, 55 pages.

M. Mealling, "Dynamic Delegation Discovery System (DDDS) Part Three: The Domain Name System (DNS) Database", Network Working Group, Request for Comments: 3403, Obsoletes: 2915,2168, Category: Standards Track, Oct. 2002, 14 pages.

L. Daigle et al., "Domain-Based Application Service Location Using SRV RRs and the Dynamic Delegation Discovery Service (DDDS)", Network Working Group, Request for Comments: 3958, Category: Standards Track, Jan. 2005, 25 pages.

C. Kaufman et al., "Internet Key Exchange Protocol Version 2 (IKEv2)", Internet Engineering Task Force (IETF), Request for Comments: 5996, Obsoletes: 4306, 4718, Category: Standards Track, ISSN: 2070-1721, Sep. 2010, 138 pages.

5G Americas Whitepaper, "Wirelesstechnology Evolution Transition from 4G to 5G", 3GPP Releases 14 to 16, Oct. 2018, 271 pages.

Cisco Technology, Inc., "5G NSA for MME", Sep. 2018, pp. 1-22.

3GPP Organizational Partners, "3rd Generation Partnership Project; Technical Specification Group Core Network and Terminals; Domain Name System Procedures; Stage 3 (Release 15)", 3GPP TS 29.303 V15.1.0, Mar. 2018, 73 pages.

Samsung, "4G-5G Interworking", RAM-level and CN-level Interworking, https://images.samsung.com/is/content/samsung/p5/global/business/networks/insights/white-paper/4g-5g-interworking/global-networks-insight-4g-5g-nterworking-0.pdf, Jun. 2017, 17 pages.

GTI, "GTI Sub-6GHz 5G Device White Paper", V2.0, http://gtigroup.org/d/file/Resources/rep/2018-02-22/c9d31709d72643e625321d6f3724d761.pdf, Jan. 30, 2018, 82 pages.

NEC Corporation, "Making 5G a Reality", https://www.NEC.com/en/global/solutions/nsp/5g_vision/doc/wp2018ar.pdf, Mar. 2018, 32 pages.

International Search Report and Written Opinion in counterpart International Application No. PCT/US2019/054429, dated Jan. 8, 2020, 18 pages.

3GPP, "3rd Generation Partnership Project; Technical Specification Group Core Network and Terminals; 5G System—Phase 1; CT WG4 Aspects (Release 15)", 3GPP TR 29.891 V15.0.0, Dec. 2017, 146 pages.

NTT Docomo, "P-CR on Solution 1: Redirection after update location procedure", SA WG2 Meeting #104, S2-142879, Jul. 7-11, 2014, 9 pages.

* cited by examiner

PROVIDING OPTIMAL PACKET DATA NETWORK GATEWAY SELECTION FOR 5G NETWORK ENVIRONMENTS UPON INITIAL USER EQUIPMENT ATTACHMENT VIA A WIFI EVOLVED PACKET DATA GATEWAY

TECHNICAL FIELD

The present disclosure relates to a communication system, in particular, to providing optimal Packet Data Network (PDN) Gateway (PGW) selection for 5G network environments upon an initial user equipment (UE) attachment via a WiFi Evolved Packet Data Gateway (ePDG).

BACKGROUND

Mobile networking architectures have grown increasingly complex in communication environments. In some cases, mobile network architectures can be implemented using Software Defined Network (SDN) techniques in order to deploy architectures in which the data path and the control path for a mobile network are split across two planes, a user plane and a control plane, such as 5G mobile network architectures. As the number of user equipment increases and 5G architectures become more prevalent for mobile networking deployments, efficient management of communication resources becomes more critical. Accordingly, there are significant challenges in facilitating 5G networking architectures.

DESCRIPTION OF EXAMPLE EMBODIMENTS

Overview

Figure 1:
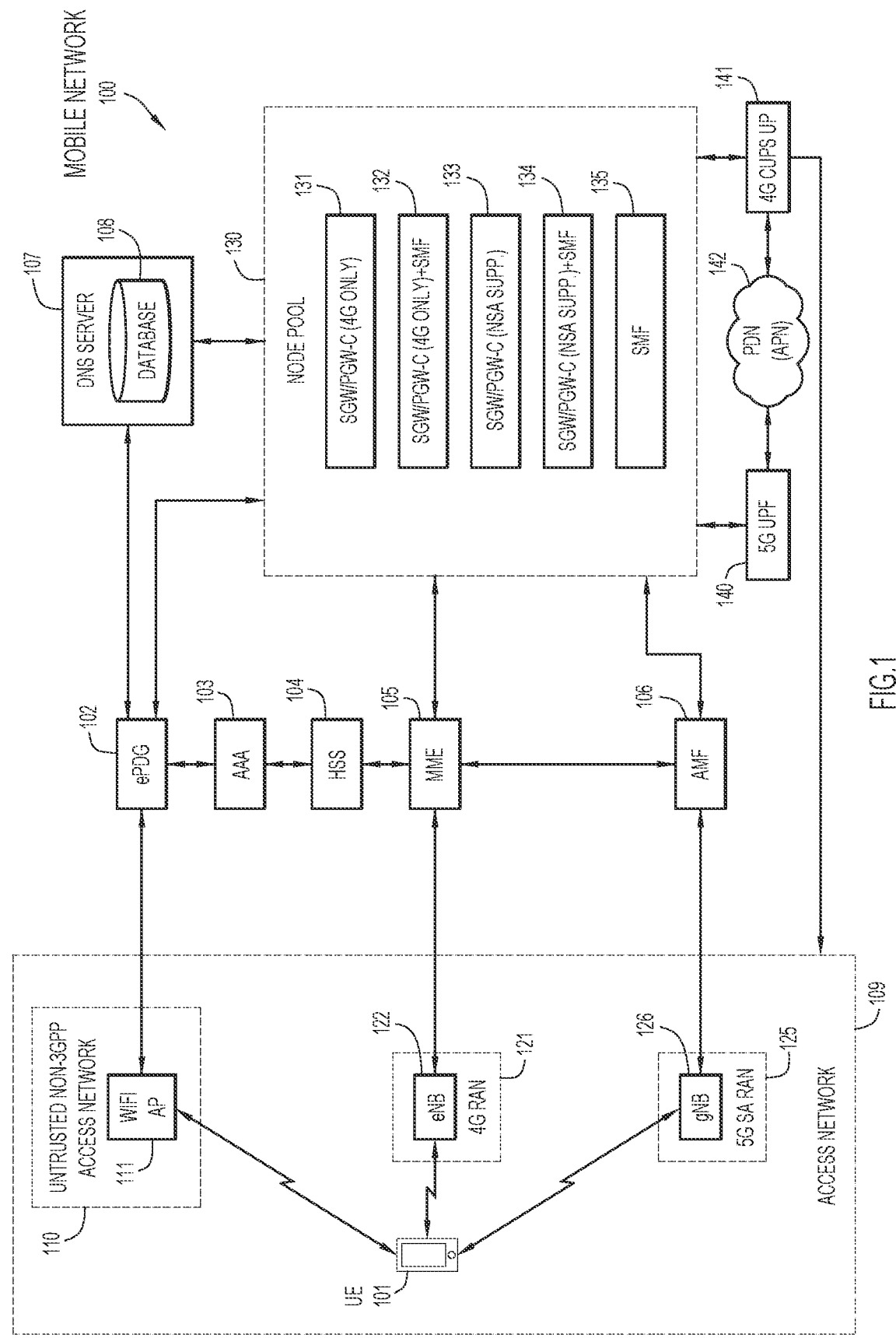
FIG. 1 is a simplified block diagram illustrating example details associated with a mobile network in which techniques that provide for optimal Packet Data Network (PDN) Gateway (PGW) selection may be implemented, according to an example embodiment.

Provided herein are is a technique to perform optimal PGW selection by an Evolved Packet Data Gateway (ePDG) to ensure that an appropriate PGW and Dual Connectivity via New Radio (DCNR) capable/Session Management Function (SMF) (PGW+SMF) combined node can be selected for a Non-Standalone (NSA)/5G capable and subscribed user equipment (UE) when the UE attaches on WiFi via an ePDG. The selection performed by the ePDG ensures that the selected anchor PGW is capable of providing 5G services after handoff from WiFi to 4G and subsequent movement and handoff to a 5G Radio Access Network (RAN). This selection also ensures that if a UE is DCNR capable and when it moves from WiFi to 4G, the ePDG initially selects a PGW that is NSA capable.

In at least one embodiment, a method is provided and may include determining, by an ePDG, whether a UE is capable to connect to a 5G SA mobile core network and/or a 5G NSA (DCNR) mobile core network; determining, by the ePDG, whether the UE is subscribed to connect to the 5G SA mobile core network and/or the 5G NSA (DCNR) mobile core network based on subscription information associated with the UE; and selecting, by the ePDG, a PGW to support a connection for the UE based on determining that the UE is capable and is subscribed to connect to the 5G SA mobile core network and/or the 5G NSA mobile core network.

EXAMPLE EMBODIMENTS

For purposes of understanding certain embodiments of systems and architectures disclosed herein, it is important to appreciate the technologies and data that may be associated with network communications for 3rd Generation Partnership Project (3GPP) Long Term Evolution (LTE) Evolved Packet Core (EPC) mobile network architectures, sometimes referred to as 4th Generation (4G)/LTE architectures, as well as 3GPP 5th Generation (5G) mobile network architectures. The following foundational information may be viewed as a basis from which the present disclosure may be properly explained.

Architectures that facilitate network communications generally rely upon three basic components: a data or user plane, a control plane, and a management plane. Typically, the user plane carries data traffic (e.g., user data traffic), while the control plane and the management plane serve the data plane. As referred to herein and in the claims, the term 'plane' can refer to a separation of traffic, operations, etc. for a network and/or network element/node.

Compute node(s) having hardware and software resources that can be abstracted into one or more logical layers can also be used to facilitate building and deploying Software Defined Network (SDN) architectures for virtualized network environments. Generally, SDN architectures provide an approach to building and deploying computer networks, networking equipment and software that separates and abstracts the control plane and user plane of networking systems. SDN decouples the control plane that makes decisions about where traffic is sent from the underlying user plane that forwards traffic to a selected destination. SDN allows network administrators, operators, etc. to manage network services through abstraction of lower level functionality into a virtualized network environment. In various embodiments, a compute node can include, but not be limited to: a data center compute node such as a server, rack of servers, multiple racks of servers, etc. for a data center; a cloud compute node, which can be distributed across one or more data centers; among others.

As referred to herein in this disclosure, the terms 'virtual machine', 'virtualized network function' and 'virtualized network functionality' can encompass an emulation of a computer system and/or computing platform operating based on the computer architecture and functions of a real or hypothetical computer, with particular embodiments involving specialized hardware, software, or a combination of both. In various embodiments, a virtualized network function (VNF), a virtual machine (VM), a virtualized network function component (VNFC), virtualized functionality and/or any virtualized network controller, element, module, aggregator, combinations thereof or the like as described herein may execute (e.g., be instantiated to perform one or more operation(s)) via a hypervisor-based virtualization or a container-based virtualization of one or more compute node(s) using the compute node(s)' hardware (e.g., processor, memory, network interfaces, etc.), software and/or operating system for a given virtualized network environment.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or other generic data units that may be used to transmit communications (e.g., data and/or commands) in a network. A packet is a formatted unit of data that can contain control or routing information (e.g., source and destination address, etc.) and data, which is also sometimes referred to as a payload or data payload. In some embodiments, control or routing information, management information, or the like can be included in packet fields, such as within header(s) and/or trailer(s) of packets.

The terms 'data', 'information', 'parameters,' and the like as used herein can refer to any type of binary, numeric, voice, video, textual or script data or information or any type of source or object code, or any other suitable data or information in any appropriate format that can be communicated from one point to another in electronic devices and/or networks. Additionally, messages, requests, responses, replies, queries, etc. are forms of network traffic and, therefore, may comprise one or more packets.

Communications in a network environment can be sent and received according to any suitable communication protocols. Suitable communication protocols can include a multi-layered scheme such as the Open Systems Interconnection (OSI) Model, or any derivations or variants thereof. Within a network architecture or environment, Internet Protocol (IP) addresses for any element in the network environment can be assigned using Dynamic Host Configuration Protocol (DHCP), Stateless Address Auto-configuration (SLAAC), during default bearer activation processes, etc., or any suitable variation thereof. IP addresses discussed herein and in the claims can include IP version 4 (IPv4) and/or IP version 6 (IPv6) addresses.

In traditional 3GPP 4G architectures, user equipment (UE) devices typically connect to a service provider mobile core network through over-the-air communications with one or more radio nodes such as evolved Node Bs (eNodeBs or eNBs) for a 3GPP Radio Access Network (RAN), which interface with control plane elements such as Mobility Management Entities (MMEs) and user plane elements such as serving Gateways (SGWs) and Packet Data Network (PDN) Gateways (PGWs). In some 4G architectures, S2a over General Packet Radio System (GPRS) Tunneling Protocol (GTP) Mobility Gateways (SaMOGs) may be used to facilitate non-3GPP accesses (e.g., for a non-3GPP Trusted Wireless Local Area Network (WLAN) access network (TWAN)) while ePDGs may be used to facilitate non-3GPP access for an untrusted non-3GPP access network to allow UEs to connect to 3GPP mobile core network services. As referred to herein and in the claims, the terms 'UE device', 'UE', 'mobile station', 'subscriber', 'user', and variations thereof can be used interchangeably.

In traditional 3GPP 4G architectures, user plane elements such as SGWs can route and forward user data packets while also acting as a mobility anchor for inter-3GPP mobility (e.g., handling mobility interfacing to other networks such as 2nd Generation (2G) and/or 3rd Generation (3G) networks) and during inter-eNodeB handoffs or handovers. Further for traditional 3GPP 4G architectures, PGWs may provide UE connectivity to external PDNs, such as the Internet, an IP Multimedia Subsystem (IMS), combinations thereof, or the like. A PGW can serve as a policy enforcement point to manage Quality of Service (QoS), flow classification, online/offline flow-based charging, data generation, shallow packet inspection, deep packet inspection (DPI), packet filtration, intercept, combinations thereof or the like. 3GPP network elements such as MMEs, PGWs, SGWs, etc. and/or elements that perform similar functionality to provide connectivity to one or more PDN Access Point Names (APNs) (e.g., the Internet, IMS, etc.) are often referred to collectively as the mobile core network or EPC.

SDN concepts can be applied to a traditional 3GPP 4G architecture to enable separation of the control and user planes in order to implement a Control and User Plane Separation (CUPS) architecture in which the control and user paths are split across the two planes thereby creating a control plane (CP) implemented via one or more controller element(s) and a user plane (UP) implemented via one or more forwarding element(s) (FE(s)). For a 3GPP 4G CUPS architecture, the control plane element(s) can include any number of MMEs, control plane SGWs (referred to herein as SGW-Cs), and control plane PGWs (referred to herein as PGW-Cs) that manipulate the user plane network infrastructure to facilitate end-to-end service provider network connectivity. Also for a 3GPP 4G CUPS architecture, the user plane (UP) FE(s) can include any number of user plane SGWs (referred to herein as SGW-Us) and user plane PGWs (referred to herein as PGW-Us) that can process and perform operations on subscriber (e.g., UE) traffic as the traffic passes through the service provider network. In some embodiments, functionality for the SGWs and PGWs can be combined to provide a System Architecture Evolution Gateways (SAEGWs), which can be implemented in a CUPS architecture as control plane SAEGWs (referred to herein as SAEGW-Cs) and user plane SAEGWs (referred to herein as SAEGW-Us). Together, the control plane and user plane elements can manage the forwarding of all subscriber traffic through a service provider network.

As referred to herein in the description and in the claims, the terms '4G CUPS UP', '4G CUPS UP elements', and variations thereof can be used interchangeably to refer to any combination of UP SGW-Us, PGW-Us, and/or SAEGW-Us that may be hosted (e.g., instantiated) via one or more compute nodes in order to provide connectivity to one or more PDNs (e.g., the Internet, etc.).

For a 3GPP 5G architecture, control plane elements can include, among other elements, an Access and Mobility Function (AMF) and a Session Management Function (SMF), and user plane elements can include User Plane Functions (UPFs), as defined in 3GPP standards. Generally, the AMF provides authentication, authorization, and mobility management for UEs. Generally, the SMF is responsible for session management with individual functions being supported on a per-session basis in which the SMF allocates IP addresses to UEs, and selects and controls the UPFs for data transfer. In some cases, an SMF can manage and control hundreds of UPFs. The SMF also acts as the external point for all communication related to the various services offered and enabled in the user plane and how the policy and charging treatment for these services is applied and controlled. Other control plane elements may be implemented, as defined in 3GPP standards. In general, an AMF may have functionality similar to that of an MME and the SMF may have functionality similar to a SGW-C/PGW-C. The UPFs may operate as VNFs to serve as forwarding engines for user traffic and may perform a variety of functions such as shallow packet inspection, DPI, traffic optimization and inline services such as Network Address Translation (NAT)/Firewall/Domain Name System (DNS) snooping, etc. In addition, UPFs may also provide some services analogous to PGW-Us in 4G CUPS architectures.

3GPP has two main architectures to facilitate 5G services. One 5G architecture is known as the 5G Standalone (SA) architecture, which includes a 3GPP 5G Radio Access Network (RAN) that interfaces with a 5G mobile core network. Another 5G architecture is known as the 5G Non-Standalone (NSA) architecture, which includes a 3GPP 5G interworking RAN that interfaces with a 4G EPC. In addition to 3GPP radio accesses such as 4G, 5G, and 5G interworking, 3GPP standards also provide a mechanism for UE to connect to the mobile core network using non-3GPP radio accesses, such as Institute of Electrical and Electronics Engineers (IEEE) Standard 802.11™-2012, published Mar. 29, 2012 (e.g., WiFi) via an Evolved Packet Data Gateway (ePDG), where the ePDG connects to a PGW in order to get access to an APN (e.g., the Internet).

Currently, when an initial UE attach occurs on a 4G/LTE access network (both in SA and NSA cases), the eNodeB selects a MME. The MME is provided with two sets of information:

1. The UE provides its DCNR capability (NSA) and 5G capability (SA) in a 3GPP Non-Access-Stratum (NAS) protocol messaging payload.

2. A Home Subscriber Server (HSS) provides the UE's DCNR (NSA) subscription and 5G (SA) subscription information during authentication.

Based on the above two sets of information, if the UE is DCNR/5G capable and has a subscription that supports such services, the MME selects a PGW in the following manner to ensure that selected anchor PGW is ready for a LTE to LTE (e.g., inter-eNodeB) handover or LTE to 5G mobile core network (5GC) handover:

1. In an SA deployment architecture, the MME uses "x-3GPP-pgw:x-s5-gtp+nc-smf" and "x-3GPP-pgw:x-s8-gtp+nc-smf" service parameters to select a PGW+SMF combined (referred to herein using the term 'combo') node as the PGW to provide services for the UE session.

2. In an NSA deployment architecture, the MME uses "x-3GPP-sgw:x-s5-gtp+nc-nr" and/or "x-3GPP-pgw:x-s8-gtp+nc-nr" service parameters to select a PGW with NSA capability to provide services for the UE session.

However, the above mechanism fails when an initial UE attach happens on WiFi via an ePDG.

There are mechanisms defined in 3GPP standards that provide for WiFi to LTE handoff and for LTE to 5G handoff. For example, 3GPP standards define some basic ground rules to be followed when a 5G capable UE with a 5G subscription moves across WiFi, 4G RAN, and 5G RAN. These include:

For an SA deployment architecture, when a UE attaches via a 4G/LTE, the MME should select a PGW+SMF combo node so that on 4G to 5G handoff the anchor PGW can also act as an SMF, as discussed above.

For an NSA deployment architecture, the anchor PGW should be Dual Connectivity via New Radio (DCNR) capable so that on a successful handoff within 4G RAN or from WiFi to 4G handoff the UE Protocol Data Unit (PDU) session continues to get the NSA 5G services.

In current deployments, however, when a 5G capable UE performs an initial attach to the mobile core network via an ePDG, both the above ground rules can't be guaranteed. This is because, as per current 3GPP standards, the ePDG has no way to know the 5G capability of a UE and also no way to select a PGW (Combo with SMF)/DCNR capable PGW. Hence during initial attach via an ePDG, if the selected PGW is not 5G/DCNR capable one or more impacts may follow, such as:

For an SA mobile core network architecture, the UE may perform a WiFi to 4G handoff successfully but subsequently if it moves from 4G to 5G RAN, the UE session will need to be torn down since the anchor PGW is not a PGW+SMF combo.

For an NSA mobile core network architecture, the UE will be able to handoff from WiFi to 4G but if the anchor PGW is not NSA (e.g., DCNR) capable, the offered QoS will be downgraded to 4G limits and the UE will not get the 5G NSA services.

Example embodiments described herein provide techniques to overcome these hurdles in order to provide optimal PGW selection by an ePDG for a mobile network. In at least one embodiment, techniques discussed herein provide a mechanism for an ePDG to determine the 5G capability of a UE during session setup, which may provide the ePDG with the ability to select an optimal PGW to service session(s) for the UE. For example, for a SA deployment, an ePDG can use the UE 5G capability information and subscription information for the UE to select a PGW that is capable of SMF functionality as well (e.g., an SMF+PGW combo node). In another example, for an NSA deployment, an ePDG can use the UE 5G capability information and subscription information for the UE to select a PGW that is capable of NSA (e.g., DCNR). In yet another example, for a mixed SA and NSA deployment, an ePDG can use the UE 5G capability information and subscription information for the UE to select a PGW that is capable of NSA support and SMF as a combo node (e.g., a PGW (NSA support)+SMF combo node).

Thus, when a UE attaches to EPC initially via an ePDG, embodiments described herein provide for the ePDG to select a PGW as anchor in such a way that same PGW anchor can serve UE when its moves later to 5GC(SA) and/or DCNR (NSA). Doing so it will allow seamless handoff to 5G (in the case of SA architectures) and/or no Compromise QoS (in the case of NSA architectures).

Referring to FIG. 1, FIG. 1 is a simplified block diagram illustrating example details associated with a mobile network 100 in which techniques that provide for optimal PGW selection may be implemented, according to an example embodiment. For the embodiment of FIG. 1, mobile network 100 illustrates example details associated with an access network 109, which includes an untrusted non-3GPP access network 110 deployment, and 3GPP access networks, such as a 4G RAN 121 deployment and a 5G SA RAN 125 deployment. Other 5G deployments, such as 5G NSA deployments, may be possible within mobile network 100, as discussed in FIG. 3, herein. In at least one embodiment, untrusted non-3GPP access network 110 may represent a Wireless Local Area Network (WLAN). Note, dashed-line boxes for various access networks are provided for illustrative purposes only and are not meant to indicate coverage boundaries of each access network; coverage for access networks discussed herein may overlap in any manner.

Returning to FIG. 1, in at least one embodiment, mobile network 100 may further include an ePDG 102, an Authentication, Authorization, and Accounting (AAA) server 103, a Home Subscriber Server (HSS) 104, an MME 105, an AMF node 106, and a Domain Name System (DNS) server 107, which may include a database 108. Mobile network 100 may further include a node pool 130, which may include any number of 4G CUPS and 5G nodes, such as: an SGW/PGW-C node 131 that may be configured to support only 4G services (referred to herein using the term 'SGW/PGW-C (4G only)'); an SGW/PGW-C (4G Only) and SMF combo node 132 that may be configured to support 4G only services and 5G SA services (referred to herein using the term 'SGW/PGW-C (4G only)+SMF'); an SGW/PGW-C node 133 that may be configured to support only 5G NSA services (referred to herein using the term 'SGW/PGW-C (NSA Supp.)'); an SGW/PGW-C (NSA Supp.) and SMF combo node 134 that may be configured to support both 5G NSA and 5G SA services (referred to herein using the term 'SGW/PGW-C (NSA Supp.)+SMF'); and an SMF node 135.

Figure 4:
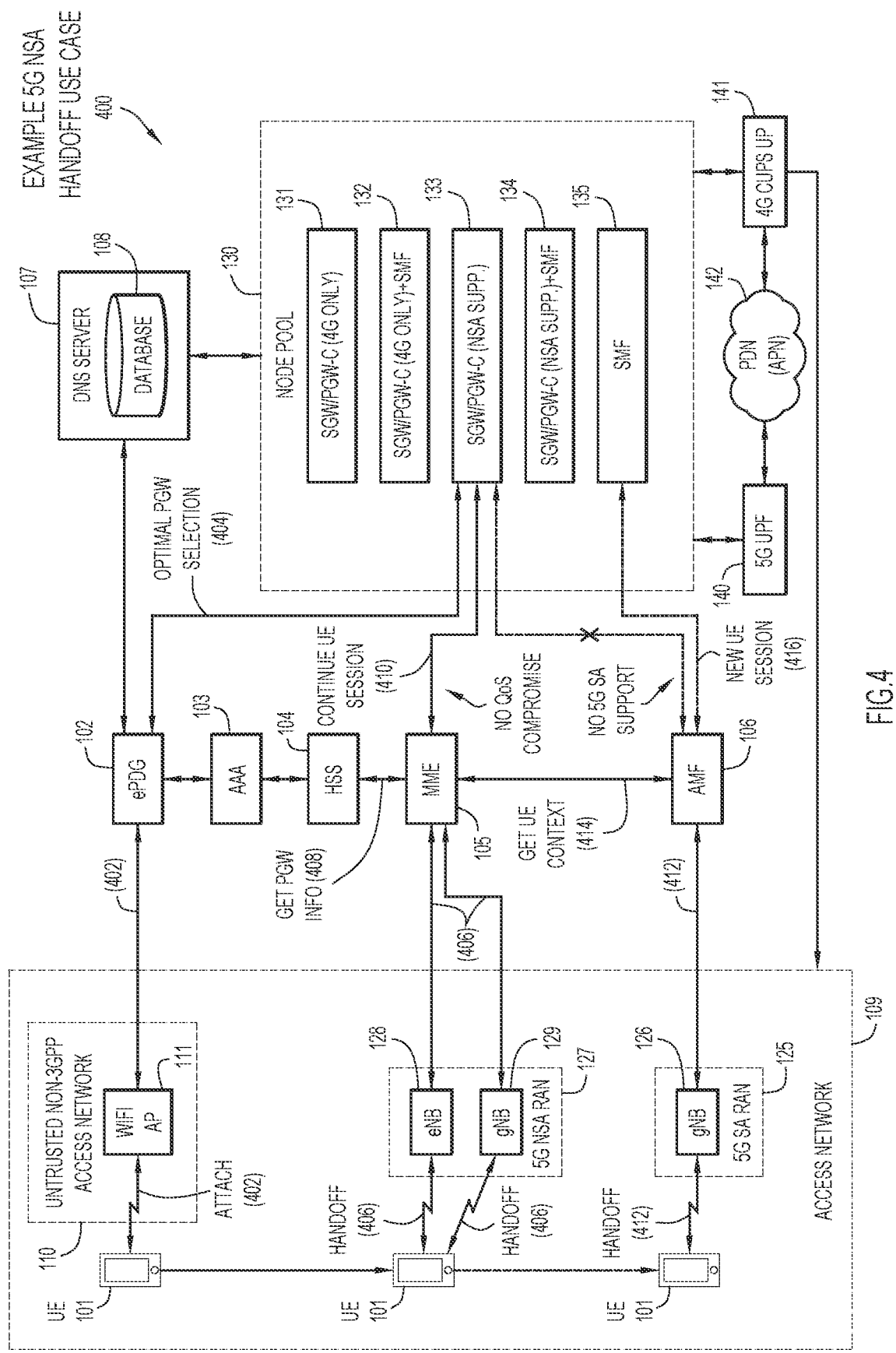
FIG. 4 is a simplified block diagram illustrating example interactions and operations associated with providing optimal PGW selection for an example 5G Non-standalone (NSA) handoff use case, according to an example embodiment.
Figure 5:
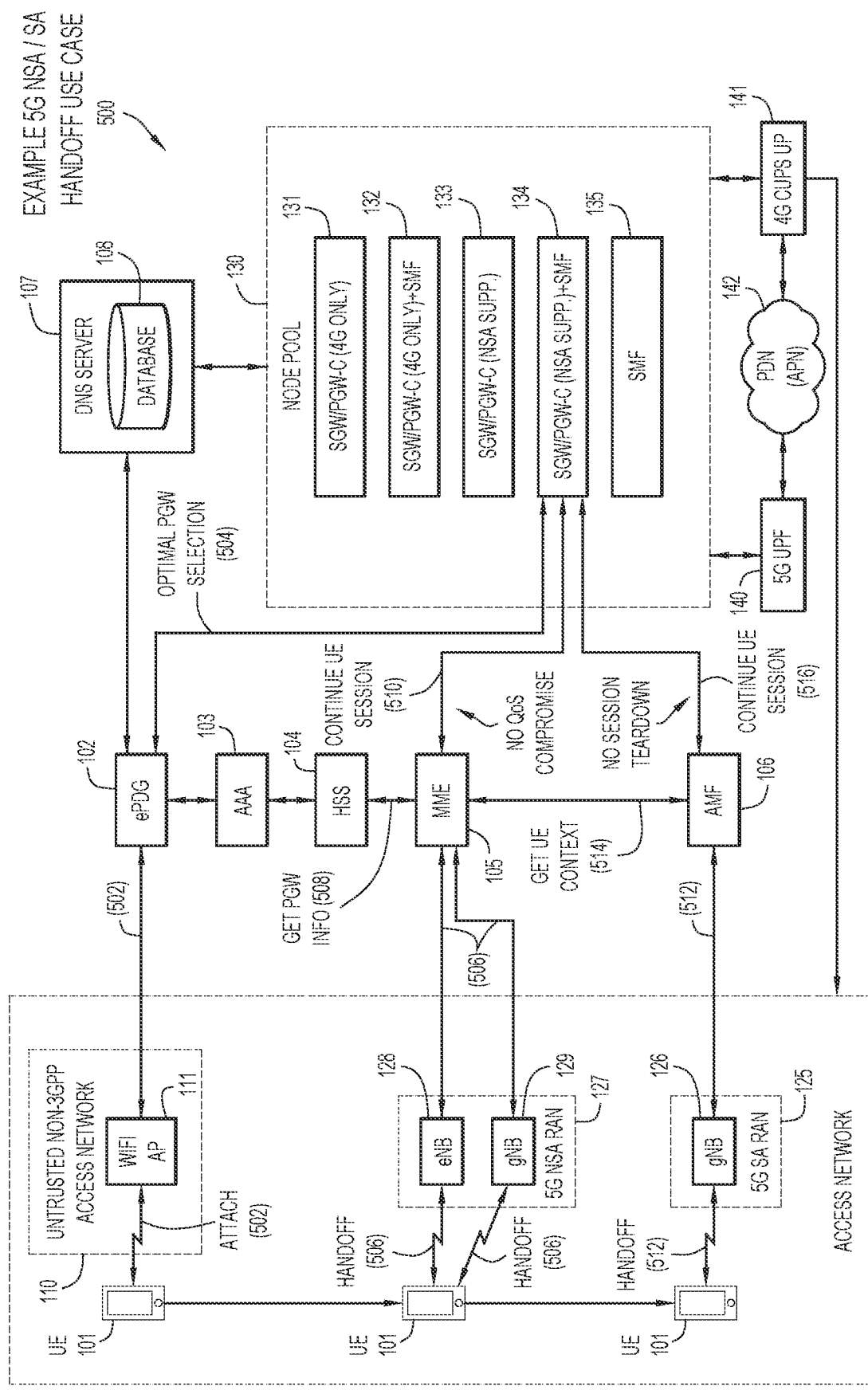
FIG. 5 is a simplified block diagram illustrating example interactions and operations associated with providing optimal PGW selection for an example 5G NSA and Standalone (SA) handoff use case, according to an example embodiment.

Although shown in FIG. 1, NSA nodes such as 'SGW/PGW-C (NSA Supp.) node 133 and/or SGW/PGW-C (NSA Supp.)+SMF 134 would typically only be provided for node pool 130 for deployments including a 5G NSA RAN, as shown in FIGS. 4-5.

As referred to in this discussion and in the claims, reference to DCNR capability may refer to NSA deployments/architectures. Accordingly, the terms 'DCNR' and 'NSA' may be used interchangeably and/or in reference to one another herein.

Mobile network 100 may further include a 5G UPF 140 and a 4G CUPS UP node 141, which may interface with a PDN 142 (e.g., for a given APN such as the Internet, etc.). Further for mobile network 100, untrusted non-3GPP access network 110 may include a WiFi access point (AP) 111, 4G RAN 121 may include an eNB 122, and 5G SA RAN 125 may include a gNodeB (gNB) 126, each of which may be capable of over-the-air (OTA) Radio Frequency (RF) communications with one or more UE, such as a UE 101, also shown in FIG. 1.

For the embodiment of FIG. 1, WiFi AP 111 may interface with ePDG 102. The ePDG 102 may further interface with AAA server 103 and one or more nodes (e.g., any of nodes 131-135) of node pool 130 and DNS server 107. DNS server 107 may further interface with one or more nodes of node pool 130. AAA server 103 may further interface with HSS 104. HSS 104 may further interface with MME 105. MME 105 may further interface with eNB 122, AMF 106, and one or more nodes of node pool 130. AMF 106 may further interface with gNB 126 and one or more nodes of node pool 130. One or more nodes of node pool 130 may further interface with 5G UPF 140 and/or 4G CUPS UP 141. Additionally, 5G UPF 140 may further interface with gNB 126 and 4G CUPS UP 141 may interface with eNB 122 via 3GPP access network 120 to provide UE session connectivity between the access network elements and PDN 142.

In at least one embodiment, one or more network elements, nodes, entities, etc. of FIG. 1 may be implemented (e.g., hosted, instantiated, etc.) for any combination of 3GPP 4G CUPS, 4G CUPS with NSA support and/or 3GPP 5G SA deployments via one or more compute node(s) having hardware and software resources, which can be abstracted into one or more instances of such elements. In various embodiments, a compute node can include, but not be limited to: a data center compute node such as a server, rack of servers, multiple racks of servers, etc. for a data center; a cloud compute node, which can be distributed across one or more data centers; combinations thereof; or the like.

It is to be understood that mobile network 100 may include any number of UEs, network elements, nodes, servers, entities, etc. depending on applications and/or implementations. In various embodiments, any other control and/or user plane elements may be present for mobile network 100, as may be defined by 3GPP standards.

Among other features, as discussed for various embodiments described herein, AAA server 103 may provide services to ePDG 102 to authenticate/authorize UE 101 that may attach to ePDG 102 via WiFi AP 111. Among other features as discussed for various embodiments described herein, HSS 104 may include one or more databases containing user-related and subscription-related information (e.g., for UE 101) and may perform functionalities such as mobility management, call and session establishment support, user authentication and access authorization for 3GPP access network 120.

In general, among other features as discussed for various embodiments described herein, MME 105 may provide tracking area list management, idle mode UE tracking, bearer activation and deactivation, SGW/PGW-C node selection and authentication services for 4G and 5G interworking (e.g., NSA) accesses. AMF 106 may provide similar features for 5G SA accesses in various embodiments.

In various embodiments, 4G CUPS UP element 141 may be implemented as any combination of a SGW-U/PGW-U or a SAEGW-U for a 4G CUPS implementation for mobile network 100. In various embodiments, UE 101 of mobile network 100 may be associated with any user, subscriber, employee, client, customer, electronic device, etc. wishing to initiate a flow in mobile network 100. The terms 'UE device', 'UE', 'subscriber', 'user', and 'mobile device' are inclusive of devices used to initiate a communication, such as a computer, an electronic device such as a parking meter, vending machine, appliance, Internet of Things (IoT) device, etc., a personal digital assistant (PDA), a laptop or electronic notebook, a cellular telephone, an iPhone™, iPad™, a Google Droid™ phone, an IP phone, wearable electronic device or any other device, component, element, or object capable of initiating voice, audio, video, media, or data exchanges within mobile network 100. UE as discussed herein may also be inclusive of a suitable interface to a human user such as a microphone, a display, a keyboard, or other terminal equipment. Further, UE as discussed herein may also be any device that seeks to initiate a communication on behalf of another entity or element such as a program, a database, or any other component, device, element, or object capable of initiating an exchange within mobile network 100. In some embodiments, UE as discussed herein may have a bundled subscription for network access and application services, etc.

In at least one embodiment, MME 105, any SGW/PGW-C node that supports 5G NSA (DCNR) services (e.g., SGW/PGW-C (NSA Supp.) node 133 and SGW/PGW-C (NSA Supp.)+SMF combo node 134), and 4G CUPS UP element 141 may be considered part of a 5G NSA core or mobile core network (other network elements may be present for the core). In general, MME 105, any SGW/PGW-C node, 4G CUPS UP element 141 may be considered part of the 4G EPC (other network elements may be present for the core). In at least one embodiment, AMF 106, any SGW/PGW-C node that supports 5G SA services (e.g., SGW/PGW-C (NSA Supp.)+SMF combo node 134 and SMF node 135), and 5G UPF 140 may be considered part of a 5G SA core or mobile core network (sometimes referred to as 5GC) (other network elements may be present for the core).

In general, techniques implemented via mobile network 100 to provide optimal PGW selection when UE 101 first attaches to the network via ePDG 102 may be divided into two parts, as follows:

Part 1: ePDG 102 determining the 5G capability and allowed subscription for UE 101.

Part 2: Selection of an optimized PGW node (or combo node) by ePDG 102.

It is to be understood that optimal selection of a PGW node implicitly involves selecting an SGW node that supports the same features as the PGW node. For example, selection of a PGW node with NSA compliance (e.g., NSA support) implicitly means selecting an SGW node also with NSA compliance. Thus, as referred to herein and in the claims, PGW selection involves both PGW and SGW selection.

In at least one embodiment, capabilities for a UE may indicate (if the UE is 5G capable) capability of the UE to use 5G in case of a 5G SA architecture and/or capability of the UE to use DCNR in case of a 5G NSA mobile core network architecture. However, if a UE is not 5G capable, neither of the 5G capabilities will be indicated for the UE. In at least one embodiment, allowed subscriptions for a 5G capable UE may indicate that the UE is allowed to use New Radio (NR) access as a secondary Radio Access Technology (RAT) type in case of a 5G NSA mobile core architecture and/or that the UE is allowed to use 5G services via a 5G SA access for a 5G SA mobile core network architecture (e.g., via AMF 106, SMF 135 and 5G UPF 140).

During operation in at least one embodiment, Part 1 of techniques implemented via mobile network 100 may include, when UE 101 initiates attachment to WiFi AP 111, ePDG 102 determining whether UE 101 is allowed (and subscribed) to use 5G handoff and/or DCNR, based on information published (e.g., provided) by UE 101 and AAA server 103.

For untrusted non-3GPP access network 110, the interface between UE 101 and ePDG 102, is an Internet Key Exchange protocol version 2 (IKEv2) based interface. IKEv2 messaging (sometimes referred to as signaling) is used, among other things, to set-up a security association (SA) (e.g., via IP Security (IPSec) or any other secure tunneling mechanism) for UE 101 to connect to the 3GPP mobile core network for a session (e.g., a call, data session, etc.) via ePDG 102. In general, IKEv2 messaging is used to facilitate, among other things, an authentication (IKE_AUTH) exchange with UE 101 through WiFi AP 111, ePDG 102, and AAA server 103 via an Extensible Authentication Protocol Authentication and Key Agreement (EAP-AKA) authentication process, as provided by Internet Engineering Task Force (IETF) Request For Comments (RFC) 5996.

In at least one embodiment, UE 101 can send 5G capability information during an initial attach to WiFi AP 111 as part of the first IKEv2 Authentication request sent to ePDG 102. In at least one embodiment, a new IKEv2 Notify payload of a type 'UE_NR_CAPABILITY' will be defined for this purpose. The UE_NR_CAPABILITY Notify payload is used by UE 101 to report its 5G capabilities to ePDG 102 via IKEv2 signaling.

Figure 2A:
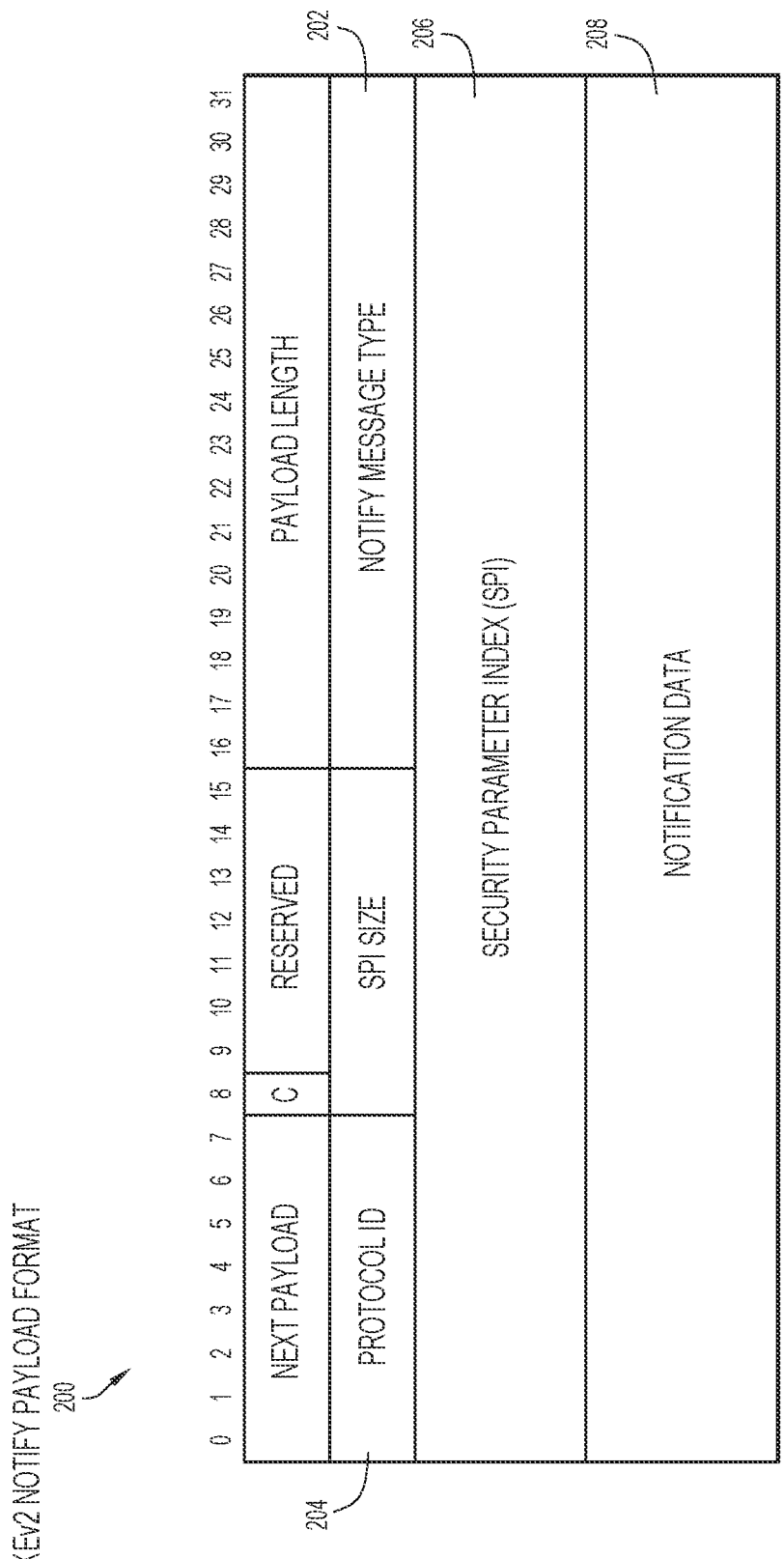
FIG. 2A is a simplified diagram illustrating example details associated with an example Internet Key Exchange protocol version 2 (IKEv2) Notify payload format that may be used to communicate user equipment (UE) 5G capability information to facilitate optimal PGW selection, according to an example embodiment.

Referring to FIG. 2A, FIG. 2A is a simplified diagram illustrating details associated with an example IKEv2 Notify payload format 200 that may be used to communicate UE 5G capability information to facilitate optimal PGW selection, according to an example embodiment.

In at least one embodiment, IKEv2 Notify payload format 200 may include various fields including, but not limited to, a Notify Message Type field 202, a Protocol ID field 204, a Security Parameter Index (SPI) field 206, and a Notification Data field 208. In at least one embodiment, the Notify Message Type field 202 can be set to a UE_NR_CAPABILITY message type, which may be a set to a value defined by Internet Assigned Numbers Authority (IANA) standards or may be set to a Private Defined Notify value in compliance with a Vendor or Customer ID, as defined for IKEv2 Notify Message Types from the Status Types Range. For the UE_NR_CAPABILITY message type, the Protocol ID field 204 and the SPI field 206 are set to zero.

The Notification Data field 208 will be of 32-bits with one or more bits specifying a UE capability within 5G-NR. In at least one embodiment, only Bit-0 and Bit-1 may be used and the rest of Bits-2 thru 31 may be reserved for future enhancements. For example, in such an embodiment, Bit-0, if set (e.g., set to '1'), will denote whether a UE is capable of 5G services via a 5G SA mobile core network; Bit-1, if set, will denote whether the UE is capable of DCNR for a NSA mobile core network; and Bit-2 to 31, may be reserved, in which the initiator (e.g., the UE) will set to zero and the responder (e.g., the ePDG) will ignore. In such an embodiment, any combination or both of Bit-0 and/or Bit-1 may be set, depending on the UE's 5G capabilities (e.g., '01', '10', or '11').

Returning to FIG. 1, AAA server 103 and/or HSS 104 may be provisioned with 5G subscription information for UE 101. For the IKEv2 authentication exchange with UE 101, ePDG 102 performs authentication for UE 101 with AAA server 103 in order to obtain 5G subscription information for UE 101. For example, ePDG 102 may receive 5G subscription information from AAA server 103 indicating whether UE 101 is allowed 5G handoff (for SA) and/or whether UE 101 is allowed NR as a secondary RAT type (for NSA).

In at least one embodiment, 5G subscription information for UE 101 can be published by AAA server 103 to ePDG 102 by using a newly defined Attribute-Value-Pair (AVP), referred to herein as a 'UE_NR_FEATURES' AVP.

Figure 2B:
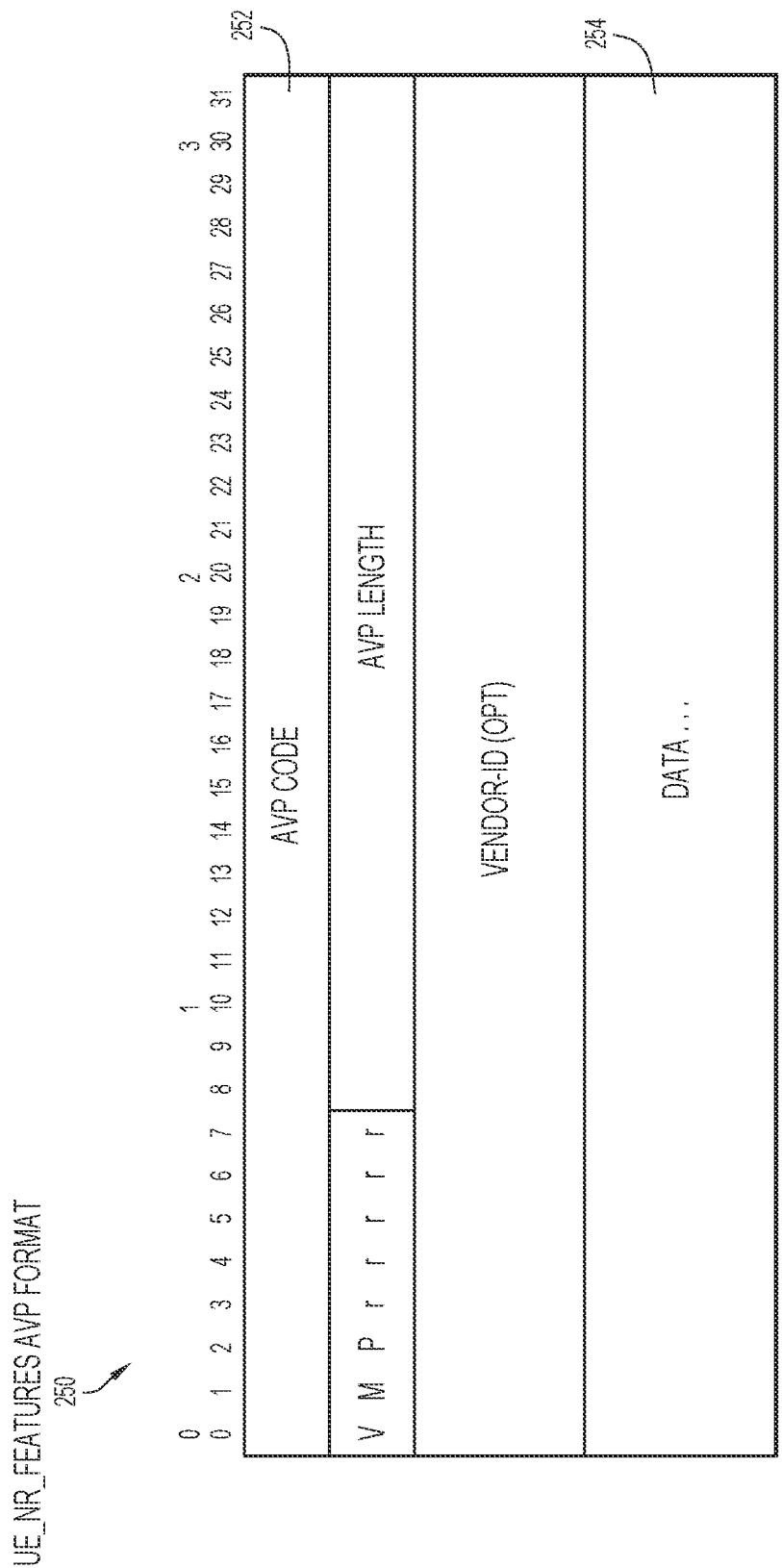
FIG. 2B is a simplified diagram illustrating example Attribute-Value-Pair (AVP) format that may be used to communicate UE 5G subscription information to facilitate optimal PGW selection, according to an example embodiment.

Referring to FIG. 2B, FIG. 2B is a simplified diagram illustrating example details associated with an example UE_NR_FEATURES AVP format 250 that may be used to communicate (e.g., publish) UE 5G subscription information, according to an example embodiment.

In at least one embodiment, UE_NR_FEATURES AVP format 250 may include various fields including, but not limited to, an AVP Code field 252 and a Data field 254. In at least one embodiment, AVP Code field 252 may be set to a value as defined per IANA standards. In at least one embodiment, Data field 254 will be of 32-bits (4-octet), with one or more bits specifying the 5G-NR capability allowed for a UE. In at least one embodiment, only Bit-0 and Bit-1 may be used for 5G related subscription indications and the rest of Bits-2 thru 31 may be reserved for future enhancements. For example, in such an embodiment, Bit-0, if set (e.g., set to '1'), will denote whether a UE is allowed (e.g., subscribed to) 5G services via a 5G SA mobile core network; Bit-1, if set, will denote whether the UE is allowed to use NR as a Secondary RAT type (e.g., for a NSA mobile core network), and Bit-2 to 31 (reserved) will set to zero and the ePDG (e.g., ePDG 102) will ignore. In such an embodiment, any combination or both of Bit-0 and/or Bit-1 may be set, depending on the UE's 5G subscription (e.g., '01', '10', or '11').

Returning to FIG. 1, in some embodiments, operators may choose to either consider both UE capability and subscription information together to provide this functionality or may rely only on subscription information in the absence of UE having the capability to report 5G capability information through an IKEv2 authentication exchange.

For implementing optimal PGW selection techniques via mobile network 100, all SGW/PGW-C nodes within node pool 130 that have a network capability to provide NR for 5G NSA services, SMF for 5G SA services, or NR for 5G NSA and SMF for 5G SA services are to be configured by a network operator with a service parameter to indicate a network capability provided via a proposed new list of service parameters, as follows:

(1) "x-3GPP-pgw:x-s2b-gtp+nc-nr" (to indicate a network capability (NC) as NR for NSA)

(2) "x-3GPP-pgw:x-s2b-gtp+nc-smf" (to indicate a network capability as SMF for 5G SA), or (3) "x-3GPP-pgw:x-s2b-gtp+nc-smf-nr" (to indicate a network capability as NR for NSA and SMF for 5G SA).

For example, for the embodiment of FIG. 1, SGW/PGW-C (4G only)+SMF combo node 132 would be configured with new service parameter "x-3GPP-pgw:x-s2b-gtp+nc-smf"; SGW/PGW-C (NSA Supp.) node 133 would be configured with new service parameter "x-3GPP-pgw:x-s2b-gtp+nc-nr"; and SGW/PGW-C (NSA Supp.)+SMF combo node 134 would be configured with new service parameter "x-3GPP-pgw:x-s2b-gtp+nc-smf-nr". SGW/PGW-C (4G only) node 131 would not be configured with a new service parameter as it provides no 5G NSA nor SA services, rather its service parameters would be defined according to current 3GPP standards as "x-3GPP-pgw:x-s2b-gtp". SMF node 135 would also not be configured with a new service parameter, as it would not be considered an eligible SGW/PGW-C node for selection by ePDG 102.

The respective service parameter for each NSA and/or SA capable SGW/PGW-C node 132, 133, and 134 within mobile network 100 as well as other nodes (e.g., SGW/PGW-C (4G only node) 131, etc.) may be stored within database 108 of DNS server 107. Service parameters for other SGW/PGW-C nodes that may not provide SA or NSA services may also be stored within database 108 of DNS server. During session establishment for UE 101, ePDG 102 may perform a DNS query via DNS server 107 for all PGWs servicing the desired APN (e.g., the Internet APN) for which UE 101 seeks connection using a Fully Qualified Domain Name (FQDN) based Straightforward-Naming Authority Pointer (S-NAPTR) query (as defined by 3GPP Technical Specification (TS) 29.303, RFC 3401, RFC 3403, etc.). An APN is a combination of a Network Identifier (NI) and Operator Identifier (OI). Typically, NI can be received by ePDG 102 in the IDr payload from UE 101 in the first IKE_AUTH Request or from AAA server 103 in a final Diameter-EAP-Answer (DEA), while OI can be prepared by ePDG 102 based on a specified 3GPP format "apn.epc.mnc<XXX>.mcc<YYY>" or the same can be received from AAA server 103 as an OI replacement string. The response from DNS server 107 will include a list of all the configured SGW/PGW-C nodes for the APN.

Based on the DNS query response, Part 2 of techniques implemented via mobile network 100 may include ePDG 102 matching the new service parameters in a specific order based on the 5G SA and/or DCNR capability and subscription of UE 101.

The following defines various use cases that may facilitate optimal PGW selection by ePDG 102. Once a PGW is selected as an anchor point for the UE 101 session, the UE can seamlessly move from WiFi to LTE and then to 5G access networks as defined in the 3GPP specifications. Recall, as noted previously, that optimal selection of a PGW node implicitly involves selecting an SGW node that supports the same features as the PGW node. Thus, the Use-Cases defined below include optimal selection of an SGW node, for example, any SGW/PGW-C node as discussed for various embodiments described herein.

Use-Case 1: UE is determined to be 5G SA and DCNR (NSA) allowed. As referred to herein, a UE that is determined to be allowed access/service means that the UE is capable and a subscription is present for the same access/service. For Use-Case 1, the ePDG may select a PGW (and SGW, e.g., SGW/PGW-C) using an ordered selection process based on a predetermined order, as defined below, and may stop the selection process once a match is found:

1. PGW is NSA compliant (NSA Supp.) and has SMF on a same (combo) node (e.g., new service parameter (3), as noted in the new service parameter list, above);

2. One of below as per operator configuration:
   2.1: PGW is NSA compliant (e.g., new service parameter (1), as noted in the above list), or
   2.2: PGW (4G only) with SMF as a combo node (e.g., new service parameter (2), as noted in the above list);

3. Usual PGW selection as per standards.

Use-Case 2: UE is determined to be 5G (SA) allowed. For Use-Case 2, the ePDG may select a PGW (and SGW, e.g., SGW/PGW-C) using an ordered selection process based on an predetermined order, as defined below, and may stop the selection process once a match is found:

1. PGW (4G only) with SMF combo node (e.g., new service parameter (2), as noted in the above list).

2. Usual SGW/PGW-C selection as per standards.

Use-Case 3: UE is determined to be DCNR (5G NSA) allowed. For Use-Case 3, the ePDG may select a PGW (and SGW, e.g., SGW/PGW-C) using an ordered selection process based on an predetermined order, as defined below, and may stop the selection process once a match is found:

1. PGW is NSA compliant (e.g., new service parameter (1) as noted in the above list);

2. Usual PGW selection as per standards.

Use-Case 4: UE is determined to be neither 5G nor DCNR allowed. For Use-Case 4, the ePDG will perform usual PGW (and SGW, e.g., SGW/PGW-C) selection as per standards.

Various example operations and interactions are now described within the context of different example handoff use cases, as discussed below for FIGS. 3-5.

Figure 3:
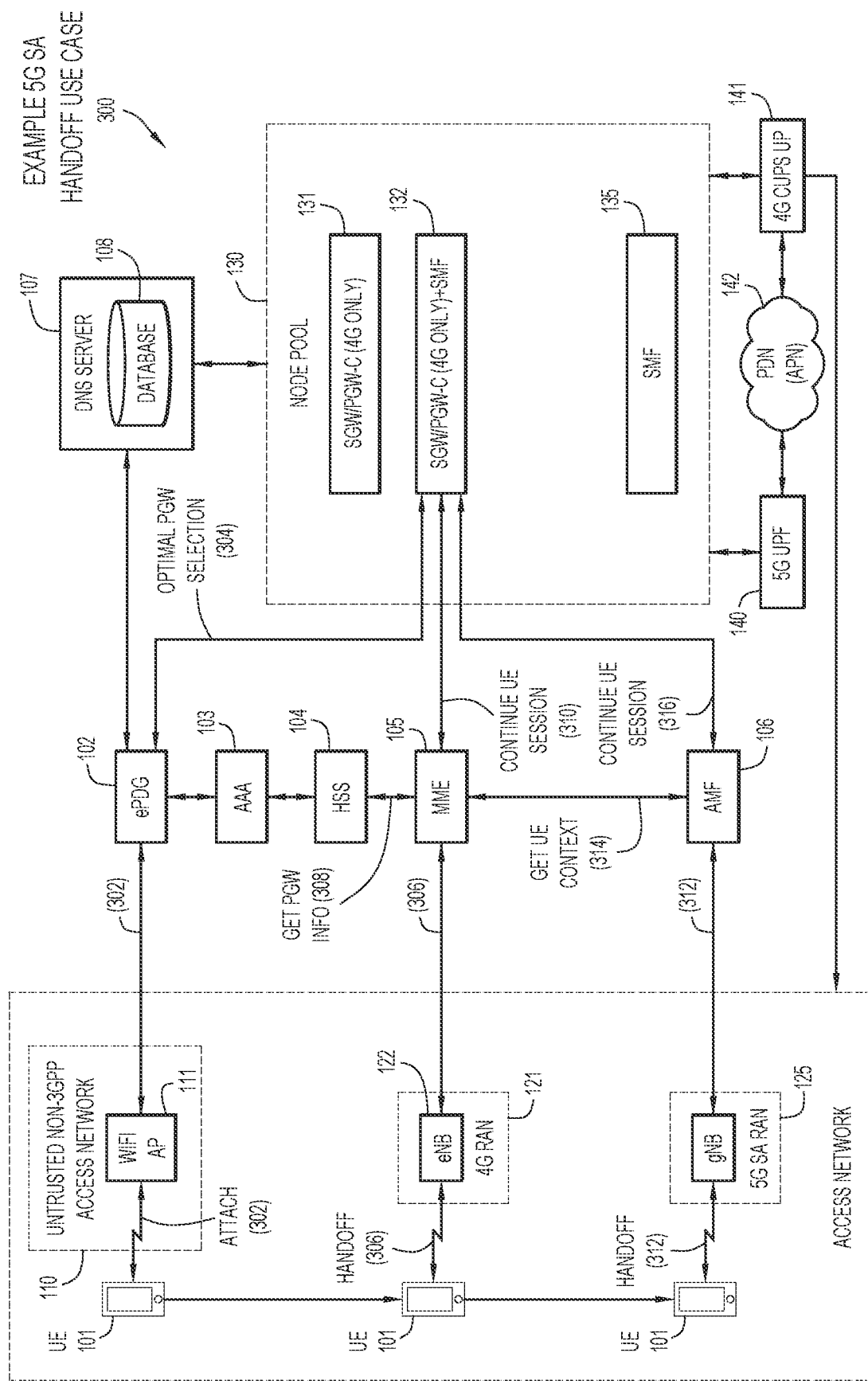
FIG. 3 is a simplified block diagram illustrating example interactions and operations associated with providing optimal PGW selection for an example 5G handoff use case, according to an example embodiment.

Referring to FIG. 3, FIG. 3 is a simplified block diagram illustrating interactions and operations associated with providing optimal PGW selection for an example 5G SA handoff use case 300, according to an example embodiment. Consider for the embodiment of FIG. 3, that UE 101 is both 5G SA and DCNR (NSA) capable and subscribed for the same services; however, only 4G RAN 121 and 5G SA RAN 125 are deployed. Thus, no SGW/PGW-C (NSA Supp.) node 133 nor SGW/PGW-C (NSA Supp.)+SMF combo node 134 would be present/configured for node pool 130. At 302, UE 101 is attached via WiFi AP 111 and ePDG 102, and ePDG 102 performs an optimal PGW selection 304 of SGW/PGW-C (4G only)+SMF combo node 132 based on the capability and subscription information for UE 101 and the service parameter configuration for SGW/PGW-C (4G only)+SMF combo node 132 (e.g., "x-3GPP-pgw:x-s2b-gtp+nc-smf") using the ordered selection process as noted for Use-Case 2, above.

Thereafter, consider that UE 101 moves and performs a handoff at 306 to eNB 122 via MME 105. At 308, MME 105 retrieves information for SGW/PGW-C (4G only)+SMF combo node 132 from HSS 104 and continues (310) the UE 101 session on the same SGW/PGW-C (4G only)+SMF combo node 132.

Thereafter, consider that UE 101 moves again and performs a handoff at 312 to gNB 126 via AMF 106. At 314, AMF 106 retrieves context information for UE 101 from MME 105 and determines that SGW/PGW-C (4G only)+SMF combo node 132 is 5G SA capable and continues (316) the UE 101 session on the same node. Since the same node (132) has SMF support, handoff for UE 101 from eNB 122 to gNB 126 is seamless and tearing down of the UE 101 session following the handover, is not needed.

However, without implementing techniques described herein, the ePDG might have randomly selected a PGW (as per usual 3GPP standards) that did not support 5G services, such as SGW/PGW-C (4G only) node 131, which would have resulted in AMF 106 having to select SMF node 135 following the 5G handover and the UE session would have had to be torn down and a fresh connection made. Thus, if optimal PGW selection were not provided by the ePDG, seamless handoff would not be achieved.

Referring to FIG. 4, FIG. 4 is a simplified block diagram illustrating interactions and operations associated with providing optimal PGW selection for an example 5G NSA handoff use case 400, according to an example embodiment. Consider for the embodiment of FIG. 4, that UE 101 is DCNR (NSA) capable and subscribed for the same services. UE 101 may be 5G SA capable, however, consider at least initially for the embodiment of FIG. 4 that 5G subscription information for UE 101 indicates that UE 101 is not subscribed to 5G SA services. Further consider for the embodiment of FIG. 4 that 3GPP access network 120 includes a 5G NSA (DCNR) RAN 127 deployment that includes an eNB 128 that interfaces with MME 105 and a gNB 129 that also interfaces with MME 105 to provide DCNR access for UE 101. Thus, at least one of SGW/PGW-C (NSA Supp.) node 133 and SGW/PGW-C (NSA Supp.)+SMF combo node 134 would be present/configured for node pool 130 for the embodiment of FIG. 4.

At 402, UE 101 is attached via WiFi AP 111 and ePDG 102, and ePDG 102 performs an optimal PGW selection 404 of SGW/PGW-C (NSA Supp.) node 133 based on the capability and subscription information for UE 101 and the service parameter configuration for SGW/PGW-C (NSA Supp.) node 133 (e.g., "x-3GPP-pgw:x-s2b-gtp+nc-nr") using the ordered selection process as noted for Use-Case 3, above.

Thereafter, consider that UE 101 moves and performs a handoff at 406 to eNB 128/gNB 129 via MME 105 and MME 105 determines that UE 101 is DCNR capable and has a subscription for the same service. At 408, MME 105 retrieves information for SGW/PGW-C (NSA Supp.) node 133 from HSS 104 and continues (410) the UE 101 session on the same node. Since the same node (133) provides support for NSA (DCNR) services, handoff for UE 101 to eNB 128/gNB 129 is provided with no QoS compromise for the UE 101 session.

However, without implementing techniques described herein, the ePDG might have randomly selected a PGW (as per usual 3GPP standards) that did not support 5G services, such as SGW/PGW-C (4G only) node 131. In such as case, the MME would continue the UE session with the same node, but QoS for the UE session would be degraded.

Consider further in at least one embodiment of FIG. 4 that, at some later time, 5G subscription information for UE 101 changes to indicate that UE 101 is subscribed to 5G SA services and UE 101 moves again and performs a handoff at 412 to gNB 126 via AMF 106. At 414, AMF 106 retrieves context information for UE 101 from MME 105 and determines that SGW/PGW-C (NSA Supp.) node 133 does not support 5G SA services. Thus, AMF 106 does not continue the UE 101 session on node 133 but rather tears down the UE session between MME 105 and SGW/PGW-C (NSA Supp.) node 133, selects SMF node 135, and establishes (416) a new session for UE 101 via SMF node 135.

Referring to FIG. 5, FIG. 5 is a simplified block diagram illustrating interactions and operations associated with providing optimal PGW selection for an example combined 5G NSA/SA handoff use case 500, according to an example embodiment. Consider for the embodiment of FIG. 5, that UE 101 is both 5G (SA) and DCNR (NSA) capable and subscribed for the same services. FIG. 5 includes 5G NSA RAN 127, thus, at least one of SGW/PGW-C (NSA Supp.) node 133 and SGW/PGW-C (NSA Supp.)+SMF combo node 134 would be present/configured for node pool 130 for the embodiment of FIG. 5. At 502, UE 101 is attached via WiFi AP 111 and ePDG 102, and ePDG 102 performs an optimal PGW selection 504 of SGW/PGW-C (NSA Supp.)+SMF combo node 134 based on the capability and subscription information for UE 101 and the service parameter configuration for SGW/PGW-C (NSA Supp.)+SMF combo node 134 (e.g., "x-3GPP-pgw:x-s2b-gtp+nc-smf-nr") using the ordered selection process as noted for Use-Case 1, above.

Thereafter, consider that UE 101 moves and performs a handoff at 506 to eNB 128/gNB 129 via MME 105 and MME 105 determines that UE 101 is DCNR capable and has a subscription for the same service. At 508, MME 105 retrieves information for SGW/PGW-C (NSA Supp.)+SMF combo node 134 from HSS 104 and continues (510) the UE 101 session on the same node. Since the same node (134) provides support for NSA (DCNR) services, handoff for UE 101 to eNB 128/gNB 129 is provided with no QoS compromise for the UE 101 session.

Thereafter, consider that UE 101 moves again and performs a handoff at 512 to gNB 126 via AMF 106. At 514, AMF 106 retrieves context information for UE 101 from MME 105 and determines that SGW/PGW-C (NSA Supp.)+SMF combo node 134 supports 5G SA services. Thus, AMF 106 continues (516) the UE 101 session on combo node 134.

Handoff for UE 101 from 5G NSA to 5G SA is seamless without tearing down the old UE session.

Figure 6:
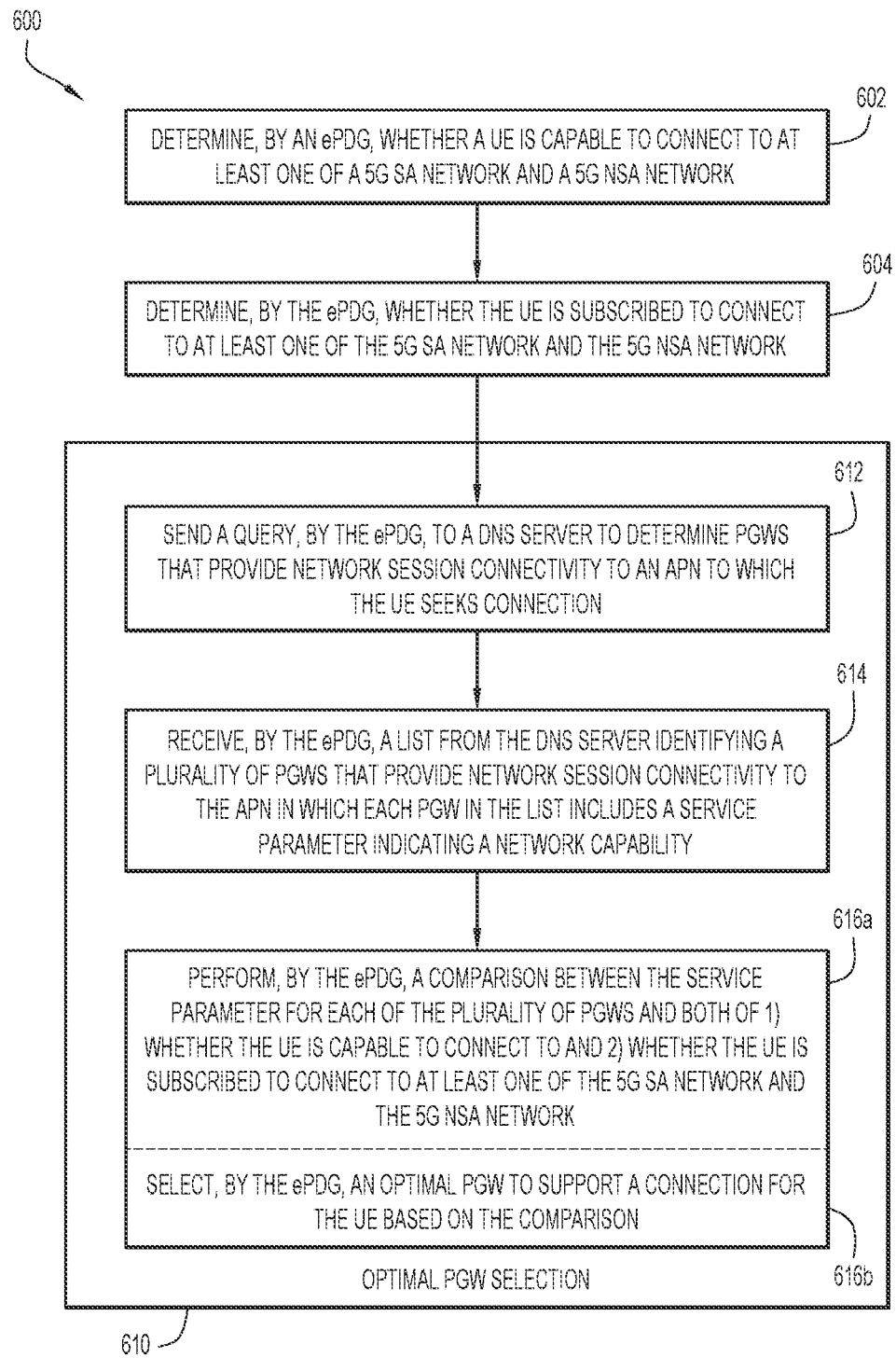
FIG. 6 is a simplified flow chart illustrating example operations associated with providing optimal PGW selection, according to an example embodiment.

Referring to FIG. 6, FIG. 6 is a simplified flow chart illustrating example operations 600 associated with providing optimal PGW selection, according to an example embodiment. In at least one embodiment, operations 600 may be performed by an ePDG (e.g., ePDG 102). Some operations may be performed by the ePDG in combination with one or more other network elements, etc. of a mobile network such as an authentication/subscription server (e.g., AAA server 103 and/or HSS 104) and/or a DNS server (e.g., DNS server 107).

At 602, the operations include determining, by the ePDG, whether a UE (e.g., UE 101) is capable to connect to at least one of a 5G SA network and a 5G NSA network. In at least one embodiment, the determining at 602 may include receiving, by the ePDG, 5G network capability information for the UE in a Notify payload of an IKEv2 authentication message (e.g., using the UE_NR_CAPABILITY Notify payload message type) in which the 5G network capability information for the UE identifies whether the whether the UE is capable to connect to at least one of the 5G SA network and the 5G NSA network.

At 604, the operations include determining, by the ePDG, whether the UE is subscribed to connect to at least one of the 5G SA network and the 5G NSA network based on subscription information associated with the UE. In at least one embodiment, the determining at 604 may include the ePDG performing authentication of the UE with an authentication/subscription server (e.g., AAA server 103 and/or HSS 104), and receiving the subscription information for the UE from the authentication/subscription server. The subscription information indicates whether the UE is subscribed to services provided by at least one of the 5G SA network and the 5G NSA network. In at least one embodiment, subscription information for the UE associated with 5G (SA and/or NSA) subscriptions can be included in an AVP, such as the UE_NR_FEATURES AVP, as discussed herein.

In some embodiments, the operations at 602 and 604 can be performed based on subscription information alone for the UE. For example, in at least one embodiment, subscription information for the UE may include both an indication of whether the UE is subscribed to connect to at least one of the 5G SA network and the 5G NSA network and an indication of whether the UE is capable to connect to at least one of the 5G SA network and the 5G NSA network.

The operations further include selection operations (610) performed by the ePDG in order to select an optimal PGW to support the network connection for the UE. At 612, the selection operations (610) may include sending, by the ePDG, a query to a DNS server (e.g., DNS server 107) to determine any PGWs that provide network session connectivity to an APN to which the UE seeks connection and receiving, from the DNS server at 614 a list identifying a plurality of PGWs that provide network session connectivity for the APN in which each PGW included in the list includes a service parameter indicating a network capability.

In at least one embodiment, the respective service parameter for each respective PGW of the plurality of PGWs may indicate one of: a 5G SA network capability (e.g., new service parameter "x-3GPP-pgw:x-s2b-gtp+nc-smf"); a 5G NSA network capability (e.g., new service parameter "x-3GPP-pgw:x-s2b-gtp+nc-nr"); a 5G SA and 5G NSA network capability (e.g., new service parameter "x-3GPP-pgw:x-s2b-gtp+nc-smf-nr"); or neither 5G SA nor 5G NSA network capability (e.g., service parameter "x-3GPP-pgw:x-s2b-gtp").

Upon receiving the list of PGWs that includes the network capability for each PGW, operations for the selection operation (610) may further include performing, at 616*a*, a comparison by the ePDG between the network capability for each respective PGW of the plurality of PGWs based on 1) whether the UE is capable to connect to (e.g., based on the 5G network capability information for the UE) and 2) whether the UE is subscribed to connect to (e.g., based on the subscription information for the UE) at least one of the 5G SA network and the 5G NSA network. At 616*b*, the selection operations (610) may include selecting, by the ePDG, an optimal PGW to support a connection for the UE based on the comparison and establishing a session for the UE with the selected optimal PGW.

In at least one embodiment, the comparison (616*a*) and selection (616*b*) operations may be based on matching the respective service parameter for each respective PGW of the plurality of PGWs returned in the list from the DNS server in a specific order based on the 5G SA and/or 5G NSA (DCNR) capability and subscription of the UE, as described for Use-Case 1 thru Use-Case 4 in order to select an optimal PGW to support the connection for the UE. Recall, as noted previously, that optimal selection of a PGW implicitly involves selecting an SGW that supports the same features as the PGW. Thus, optimal PGW node selection includes optimal selection of an SGW node, for example, any SGW/PGW-C node as discussed for various embodiments described herein.

Figure 7:
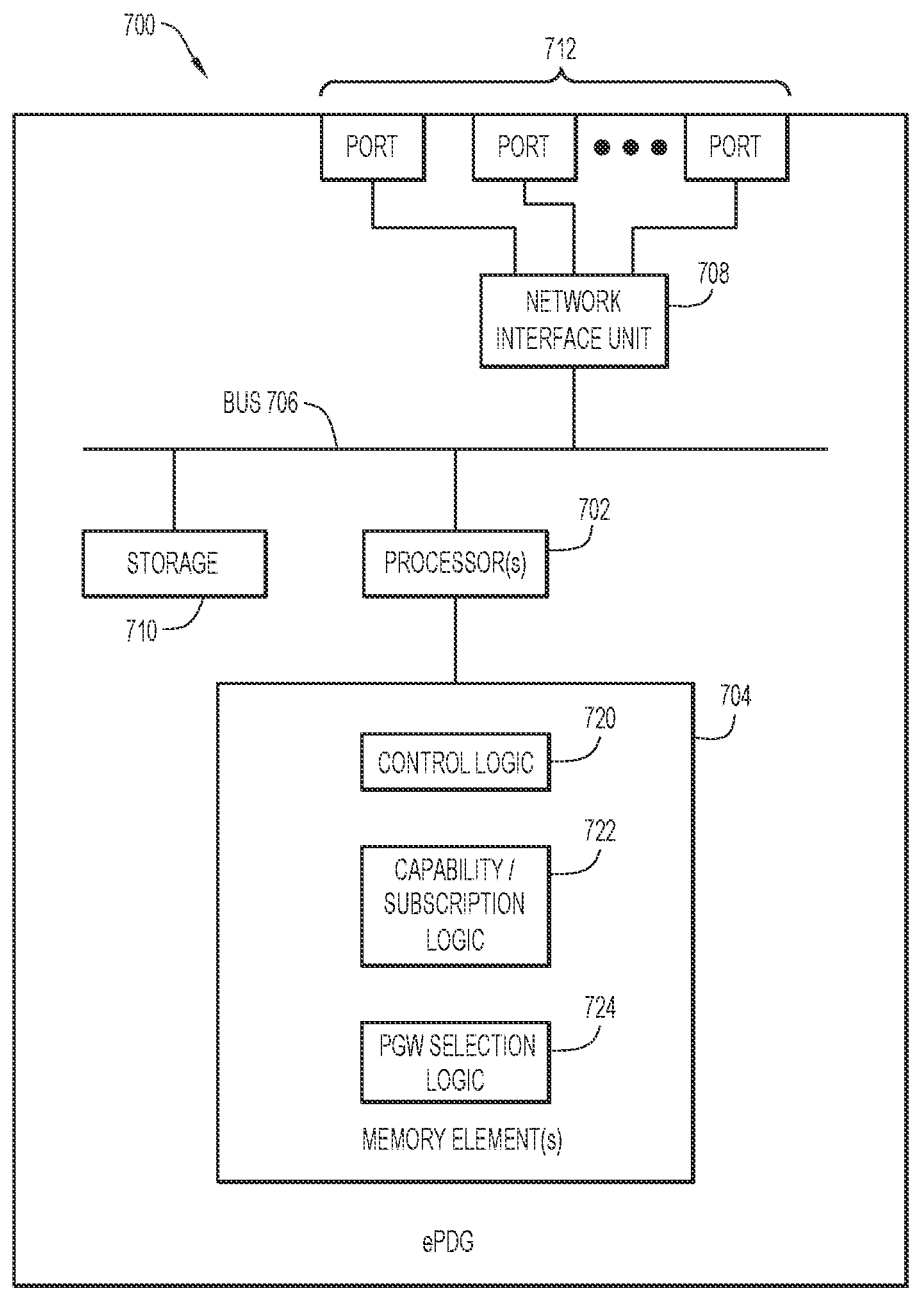
FIG. 7 is a simplified block diagram illustrating example details associated with an Evolved Packet Data Gateway (ePDG) for implementing operations described herein, according to an example embodiment.

Referring to FIG. 7, FIG. 7 is a simplified block diagram illustrating example details associated with an ePDG 700 for implementing operations described herein, according to an example embodiment. In at least one embodiment, ePDG 102 may include features as discussed for ePDG 700 of the embodiment of FIG. 7. The embodiment of FIG. 7 illustrates ePDG 700, which includes one or more processor(s) 702, one or more memory element(s) 704, a bus 706, a network interface unit 708, and storage 710. Memory element(s) 704 may include instructions for control logic 720, capability/subscription logic 722, and PGW selection logic 724.

In at least one embodiment, processor(s) 702 is/are at least one hardware processor configured to execute various tasks, operations, and/or functions for ePDG 700 as described herein according to software and/or instructions configured for ePDG 700. In at least one embodiment, memory element(s) 704 is/are configured to store data, information, software and/or instructions associated with ePDG 700 and logic configured for memory element(s) 704. In at least one embodiment, bus 706 can be configured as an interface that enables one or more elements of ePDG 700 (e.g., network interface unit 708, processor(s) 702, memory element(s) 704 (and logic configured therein), etc. to communicate in order to exchange information and/or data. In at least one embodiment, a fast kernel-hosted interconnect may be employed for ePDG 700, potentially using shared memory between processes, which can enable efficient communication paths between the processes. In various embodiments, network interface unit 708 enables communication between ePDG 700 and other computing and/or networking entities, via one or more ports 712 at which traffic is received and transmitted to facilitate operations discussed for various embodiments described herein. In some embodiments, network interface unit 708 can include and/or be configured with one or more Linecards, one or more Ethernet driver(s) and/or controller(s), and/or other similar network interface driver(s)/controller(s)/device(s) to enable communications for ePDG 700 within mobile network 100. In general, ePDG 700 can include any suitable interfaces for receiving, transmitting, and/or otherwise communicating data or information in a network environment.

In various embodiments, storage 710 can be configured to store data, data structures, databases, information, instructions, and/or the like associated with ePDG 700 and/or logic configured for memory element(s) 704. Note that in certain examples, storage 710 can be consolidated with memory elements 704 (or vice versa), and/or the storage/memory elements can overlap/exist in any other suitable manner.

In at least one embodiment, control logic 720 can include instructions that, when executed (e.g., by processor(s) 702), cause ePDG 700 to perform operations, which can include, but not be limited to providing control and/or management operations for ePDG 700, cooperating and/or interacting with other logic; maintaining and/or interacting with stored data, information, parameters (e.g., memory element(s), storage, data structures, databases, tables, etc.); combinations thereof; and/or the like to facilitate any operations as discussed for various embodiments described herein.

In at least one embodiment, capability/subscription logic 722 can include instructions that, when executed (e.g. by processor(s) 702), cause ePDG 700 to perform various operations, which can include, but not be limited to, performing communication exchanges with any UE and/or computing and/or network entity (e.g., an AAA server) to determine 5G capability information for a UE (e.g., by checking bits of notification data of an IKEv2 UE_NR_CAPABILITY Notify payload) and/or to determine subscription information for a UE (e.g., by checking bits of data of a UE_NR_FEATURES AVP), cooperating and/or interacting with other logic; maintaining and/or interacting with stored data, information, parameters (e.g., memory element(s), storage, data structures, databases, tables, etc.); combinations thereof; and/or the like to facilitate any operations as discussed for various embodiments described herein In at least one embodiment, PGW selection logic 724 can include instructions that, when executed (e.g., by processor(s) 702), cause ePDG 700 to perform various PGW selection operations, which can include, but not be limited to, performing communication exchanges with any UE and/or computing and/or network entity, performing DNS queries, matching service parameters for PGWs in a specific order based on the 5G SA and/or 5G NSA (DCNR) capability and subscription of a UE, cooperating and/or interacting with other logic; maintaining and/or interacting with stored data, information, parameters (e.g., memory element(s), storage, data structures, databases, tables, etc.); combinations thereof; and/or the like to facilitate any operations as discussed for various embodiments described herein.

In various embodiments, memory element(s) 704 may include any suitable memory element such as random access memory (RAM), dynamic RAM (DRAM), static RAM (SRAM), and/or cache memory. In general, memory element(s) 704 can include any suitable volatile or non-volatile computer readable storage media, which may be inclusive of non-transitory tangible media and/or non-transitory computer readable storage media that is capable of storing program/logic/software instructions and/or digital information.

In various embodiments, storage 710 may include any suitable storage such as persistent storage, which may be a magnetic disk drive, a solid state hard drive, a semiconductor storage device, read only memory (ROM), an erasable programmable read only memory (EPROM), flash memory, and/or any other computer readable storage media, which may be inclusive of non-transitory tangible media and/or non-transitory computer readable storage media, that is capable of storing program/logic/software instructions and/or digital information. In some embodiments, the media used by storage 710 may also be removable. For example, a removable hard drive may be used for storage 710. Other examples include optical and magnetic disks, thumb drives, and smart cards that are inserted into a drive for transfer onto another computer readable storage medium that is also part of storage 710.

Figure 8:
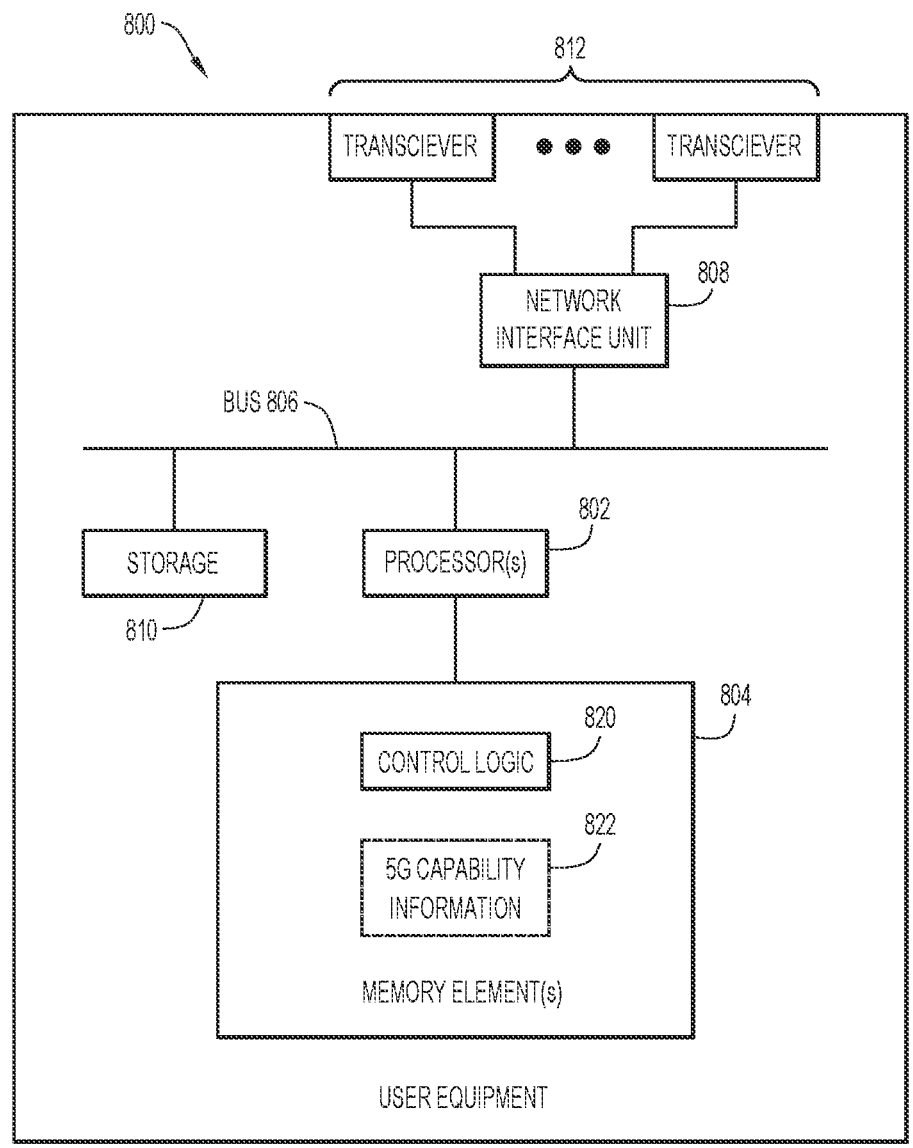
FIG. 8 is a simplified block diagram illustrating example details associated with a user equipment for implementing operations described herein, according to an example embodiment.

Referring to FIG. 8, FIG. 8 is a simplified block diagram illustrating example details associated with a UE 800 for implementing operations described herein, according to an example embodiment. In at least one embodiment, UE 101 may include features as discussed for UE 800 of the embodiment of FIG. 8. The embodiment of FIG. 8 illustrates UE 800, which includes one or more processor(s) 802, one or more memory element(s) 804, a bus 806, a network interface unit 808, and storage 810. Memory element(s) 804 may include instructions for control logic 820. In at least one embodiment, memory element(s) 804 may also include 5G capability information 822 for UE 800. However, in other embodiments, such capability information for the UE may maintained via subscription information for the UE.

In various embodiments, UE 800 may be any UE described herein (e.g., UE), which may be capable of performing over-the-air RF communications for WiFi accesses, 4G accesses and/or 5G SA/NSA accesses. In some embodiments, UE 800 may also be capable of performing over-the-air communications for other communications standards such as 3GPP 2G and/or 3G accesses, WiMax, IEEE Standard 802.16™-2012, published Aug. 17, 2012, Radio-frequency Identification (RFID), Near Field Communication (NFC), Bluetooth™, etc.

In at least one embodiment, processor(s) 802 is/are at least one hardware processor configured to execute various tasks, operations, and/or functions for UE 800 as described herein according to software and/or instructions configured for UE 800. In at least one embodiment, memory element(s) 804 is/are configured to store data, information, software and/or instructions associated with UE 800 and logic configured for memory element(s) 804. In at least one embodiment, bus 806 can be configured as an interface that enables one or more elements of UE 800 (e.g., network interface unit 808, processor(s) 802, memory element(s) 804 (and logic configured therein), etc. to communicate in order to exchange information and/or data. In at least one embodiment, a fast kernel-hosted interconnect may be employed for UE 800, potentially using shared memory between processes, which can enable efficient communication paths between the processes. In various embodiments, network interface unit 808 enables communication between UE 800 and other network elements, via one or more transceivers 812 (e.g., receive and transmit units) at which traffic is received and transmitted to facilitate operations discussed for various embodiments described herein. In some embodiments, network interface unit 808 can be configured with one or more radio access network interface driver(s) and/or controller(s) to enable communications for UE 800 within mobile network 100. UE 800 can include any suitable interfaces for receiving, transmitting, and/or otherwise communicating data or information in a network environment.

In various embodiments, storage 810 can be configured to store data, data structures, databases, information, instructions, and/or the like associated with UE 800 and/or logic configured for memory element(s) 804. Note that in certain examples, storage 810 can be consolidated with memory elements 804 (or vice versa), and/or the storage/memory elements can overlap/exist in any other suitable manner.

In various embodiments, 5G capability information 822 may include any information, data, data structures, or the like indicating the capability of UE 800 to connect to 5G SA and/or NSA (DCNR) networks to facilitate various operations as discussed herein. In some embodiments, 5G capability information 822 may be preconfigured by an equipment manufacturer for UE 800; however, in other embodiments, 5G capability information may be configured through any combination of software updates, firmware updates, etc. that may be provided for UE 800.

In at least one embodiment, control logic 820 can include instructions that, when executed (e.g., by processor(s) 802), cause UE 800 to perform operations, which can include, but not be limited to providing control and/or management operations for UE 800; cooperating and/or interacting with other logic; maintaining and/or interacting with stored data, information, parameters (e.g., memory element(s), storage, data structures, databases, tables, etc.); performing IKEv2 processes/exchanges with ePDGs (e.g., to send 5G capability information as a Notify payload of a first IKE_AUTH request with an ePDG, performing attaches/handovers to various access elements, performing PDN session creation processes/exchanges with one or computing and/or networking entities; cooperating and/or interacting with other logic; maintaining and/or interacting with stored data, information, parameters (e.g., memory element(s), storage, data structures, databases, tables, etc.); combinations thereof; and/or the like to facilitate any operations as discussed for various embodiments described herein.

In various embodiments, memory element(s) 804 may include any suitable memory element such as RAM, DRAM, SRAM, and/or cache memory. In general, memory element(s) 804 can include any suitable volatile or non-volatile computer readable storage media, which may be inclusive of non-transitory tangible media and/or non-transitory computer readable storage media that is capable of storing program/logic/software instructions and/or digital information.

In various embodiments, storage 810 may include any suitable storage such as persistent storage, which may be a magnetic disk drive, a solid state hard drive, a semiconductor storage device, ROM, EPROM, flash memory, and/or any other computer readable storage media, which may be inclusive of non-transitory tangible media and/or non-transitory computer readable storage media, that is capable of storing program/logic/software instructions and/or digital information. In some embodiments, the media used by storage 810 may also be removable. For example, a removable hard drive may be used for storage 810. Other examples include optical and magnetic disks, thumb drives, and smart cards that are inserted into a drive for transfer onto another computer readable storage medium that is also part of storage 810.

Figure 9:
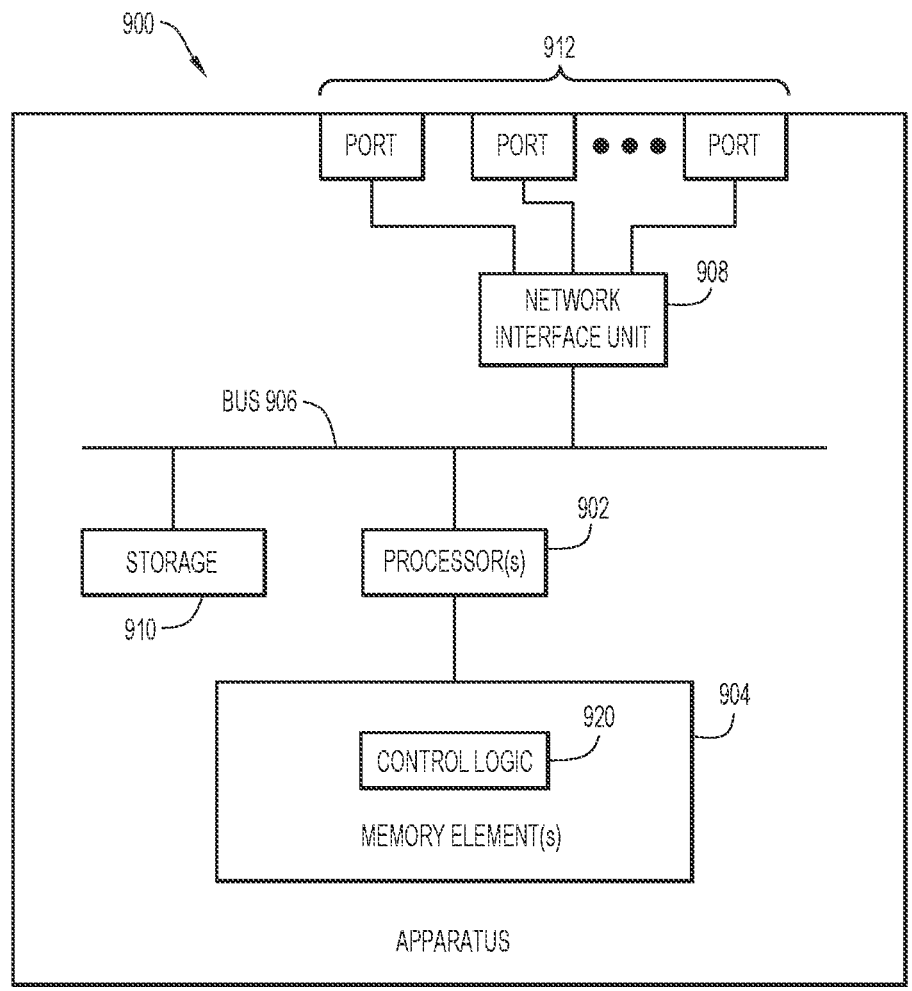
FIG. 9 is a simplified block diagram illustrating example details associated with a computing or networking apparatus configured to participate in operations described herein, according to an example embodiment.

Referring to FIG. 9, FIG. 9 is a simplified block diagram illustrating example details associated with a computing or networking element/server/node/entity/apparatus 900 that may be configured to perform operations of an AAA server, HSS, DNS server, MME, AMF and/or any other entities that may be involved in mechanisms/techniques discussed herein, according to an example embodiment. It should be appreciated that FIG. 9 provides only an illustration of one embodiment and does not imply any limitations with regard to the environments in which different embodiments may be implemented. Many modifications to the depicted environment may be made.

The embodiment of FIG. 9 illustrates apparatus 900, which includes one or more processor(s) 902, one or more memory element(s) 904, a bus 906, a network interface unit 908, and storage 910. Memory element(s) 904 may include instructions for control logic 920.

In some embodiments, apparatus 900 can be implemented as a compute node, such as: as a data center compute node such as a server, rack of servers, multiple racks of servers, etc. for a data center; as a cloud compute node, which can be distributed across one or more data centers; as combinations thereof or the like. In various embodiments, processor(s) 902, memory element(s) 904, bus 906, network interface unit 908, storage 910 and logic, software, etc. configured for apparatus 900 can represent hardware, software, and network resources, which can be abstracted into a 4G CUPS architecture and/or 5G SA and/or NSA architecture for mobilelll network 100 comprising any number or instances of entities (e.g., any of nodes 131-135, AMF 106, 5G UPF 140, 4G CUPS UP element 141, etc.) discussed herein.

In at least one embodiment, processor(s) 902 is/are at least one hardware processor configured to execute various tasks, operations, and/or functions for apparatus 900 as described herein according to software and/or instructions configured for apparatus 900. In at least one embodiment, memory element(s) 904 is/are configured to store data, information, software and/or instructions associated with apparatus 900 and logic configured for memory element(s) 904. In at least one embodiment, bus 906 can be configured as an interface that enables one or more elements of apparatus 900 (e.g., network interface unit 908, processor(s) 902, memory element(s) 904 (and logic configured therein), etc. to communicate in order to exchange information and/or data. In at least one embodiment, a fast kernel-hosted interconnect may be employed for apparatus 900, potentially using shared memory between processes (e.g., VNFs, etc.), which can enable efficient communication paths between the processes. In various embodiments, network interface unit 908 enables communication between apparatus 900 and other entities via one or more ports 912 at which traffic is received and transmitted to facilitate operations discussed for various embodiments described herein. In some embodiments, network interface unit 908 can include and/or be configured with one or more Linecards, one or more Ethernet driver(s) and/or controller(s), and/or other similar network interface driver(s) and/or controller(s) to enable communications for apparatus 900 within a network environment. Apparatus 900 can include any suitable interfaces for receiving, transmitting, and/or otherwise communicating data or information in a network environment.

In various embodiments, storage 910 can be configured to store data, data structures, databases, information, instructions, and/or the like associated with apparatus 900 and/or logic configured for memory element(s) 904. For example, in some embodiments, storage 910 may represent a database (e.g., database 108 for DNS server 107) for apparatus 900. Note that in certain examples, storage 910 can be consolidated with memory elements 904 (or vice versa), and/or the storage/memory elements can overlap/exist in any other suitable manner.

In at least one embodiment, control logic 920 can include instructions that, when executed (e.g., by processor(s) 902), cause apparatus 900 to perform operations, which can include, but not be limited to providing control and/or management operations for apparatus 900, cooperating and/or or interacting with other logic; maintaining and/or interacting with stored data, information, parameters (e.g., memory element(s), storage, data structures, databases, tables, etc.);

combinations thereof; and/or the like to facilitate any operations as discussed for various embodiments described herein.

In various embodiments, memory element(s) 904 may include any suitable memory element such as RAM, DRAM, SRAM, and/or cache memory. In general, memory element(s) 904 can include any suitable volatile or non-volatile computer readable storage media, which may be inclusive of non-transitory tangible media and/or non-transitory computer readable storage media that is capable of storing program/logic/software instructions and/or digital information.

In various embodiments, storage 910 may include any suitable storage such as persistent storage, which may be a magnetic disk drive, a solid state hard drive, a semiconductor storage device, ROM, an EPROM, flash memory, and/or any other computer readable storage media, which may be inclusive of non-transitory tangible media and/or non-transitory computer readable storage media, that is capable of storing program/logic/software instructions and/or digital information. In some embodiments, the media used by storage 910 may also be removable. For example, a removable hard drive may be used for storage 910. Other examples include optical and magnetic disks, thumb drives, and smart cards that are inserted into a drive for transfer onto another computer readable storage medium that is also part of storage 910.

In summary, as illustrated by the embodiments of FIGS. 1-9, the solution and techniques as discussed herein provide a mechanism to perform optimal PGW selection at the ePDG to ensure that appropriate an DCNR capable/PGW+SMF combo node is selected for a NSA/5G SA capable and subscribed UE when the UE attaches on WiFi via the ePDG. This selection ensures that the selected anchor PGW is capable of providing 5G services after handoff from WiFi to 4G and subsequent movement and handoff to a 5G RAN.

In various embodiments, advantages of the solutions and techniques discussed herein may include, but not be limited to:

1. No major change in the 3GPP call flows.
2. Only introduction of a new AVP in the messaging between the AAA server and the ePDG and a new Notify payload between UE-EPDG to indicate the UE is 5G SA capable and/or DCNR (NSA) capable.
3. Optimal PGW selection by the ePDG from DNS query response with new service parameters, which may only cause configuration changes on DNS servers.
4. The same techniques can be implemented when a UE connects via a non-3GPP TWAN (e.g., via a SaMOG implemented with optimal PGW selection functionality (e.g., hardware, software, logic, etc., as discussed herein)).

In various embodiments, various business aspects may be achievable including, but not limited to, providing seamless call support (e.g., for an SA mobile core network architecture) and no QoS compromise (e.g., for an NSA mobile core network architecture) may help to implement LTE/5G and WiFi solutions for network service providers/operators; fixing limitations of both SA and NSA if a UE attaches initially via WiFi with an ePDG; and/or improving customer/subscriber experiences in terms of no discontinuation of services and QoS through implementation of techniques described herein.

In one form, techniques presented herein provide a computer-implemented method of determining, by an evolved packet data gateway, whether a user equipment (UE) is capable to connect to at least one of a standalone mobile core network and a non-standalone mobile core network, determining, by the evolved packet data gateway, whether the UE is subscribed to connect to at least one of the standalone mobile core network and the non-standalone mobile core network based on subscription information associated with the UE, and selecting, by the evolved packet data gateway, a packet data network gateway to support a connection for the UE based, at least in part, on determining that the UE is capable and is subscribed to connect to at least one of the standalone mobile core network and the non-standalone mobile core network.

Further for the computer-implemented method, the determining, by the evolved packet data gateway, whether the UE is capable to connect to at least one of the standalone mobile core network and the non-standalone mobile core network may include receiving, by the evolved packet data gateway, network capability information for the UE in an Internet Key Exchange version 2 (IKEv2) message, wherein the network capability information for the UE identifies whether the UE is capable to connect to at least one of the standalone mobile core network and the non-standalone mobile core network. Further for the computer-implemented method, the determining, by the evolved packet data gateway, whether the UE is subscribed to connect to at least one of the standalone mobile core network and the non-standalone mobile core network may further include performing authentication of the UE with an authentication server; and receiving the subscription information for the UE from the authentication server. The subscription information for the UE may be included in an attribute-value-pair that identifies whether the UE is subscribed to connect to at least one of the standalone mobile core network and the non-standalone mobile core network.

Further for the computer-implemented method, the selecting may further include sending, by the evolved packet data gateway, a query to a domain name system to determine packet data network gateways that provide session connectivity for an access point name; and receiving a list identifying a plurality of packet data network gateways that provide session connectivity for the access point name, wherein each packet data network gateway identified in the list includes a service parameter indicating a network capability. Further for the computer-implemented method, the selecting may further include performing a comparison between the service parameter for each of the plurality of packet data network gateways and both of 1) whether the UE is capable to connect to and 2) whether the UE is subscribed to connect to at least one of the standalone mobile core network and the non-standalone mobile core network. The service parameter for each packet data network gateway of the plurality of packet data network gateways may indicate one of: a 5G standalone mobile core network capability; a 5G non-standalone mobile core network capability; a 5G standalone and a 5G non-standalone mobile core network capability; and no 5G standalone nor 5G non-standalone mobile core network capability. Further for the computer-implemented method, based on a determination that the UE is capable and is subscribed to connect to both the standalone mobile core network and the non-standalone mobile core network, the selected packet data network gateway has at least one of the 5G standalone mobile core network capability and the 5G non-standalone mobile core network capability.

In another form, one or more non-transitory computer readable storage media are provided. The non-transitory computer readable storage media may include instructions that, when executed by a processor, cause the processor to perform operations comprising determining, by an evolved packet data gateway, whether a user equipment (UE) is capable to connect to at least one of a standalone mobile core network and a non-standalone mobile core network, determining, by the evolved packet data gateway, whether the UE is subscribed to connect to at least one of the standalone mobile core network and the non-standalone mobile core network based on subscription information associated with the UE, and selecting, by the evolved packet data gateway, a packet data network gateway to support a connection for the UE based, at least in part, on determining that the UE is capable and is subscribed to connect to at least one of the standalone mobile core network and the non-standalone mobile core network.

In another form, an evolved packet data gateway is provided that includes at least one memory element for storing data and at least one processor for executing instructions associated with the data in which executing the instructions causes the evolved packet data gateway to perform operations, comprising determining, by the evolved packet data gateway, whether a user equipment (UE) is capable to connect to at least one of a standalone mobile core network and a non-standalone mobile core network, determining, by the evolved packet data gateway, whether the UE is subscribed to connect to at least one of the standalone mobile core network and the non-standalone mobile core network based on subscription information associated with the UE, and selecting, by the evolved packet data gateway, a packet data network gateway to support a connection for the UE based, at least in part, on determining that the UE is capable and is subscribed to connect to at least one of the standalone mobile core network and the non-standalone mobile core network.

The operations described herein may be identified based upon the application for which they are implemented in a specific embodiment. However, it should be appreciated that any particular operation nomenclature herein is used merely for convenience, and thus the embodiments should not be limited to use solely in any specific application identified and/or implied by such nomenclature.

Data relating to operations described herein may be stored within any conventional or other data structures (e.g., files, arrays, lists, stacks, queues, records, etc.) and may be stored in any desired storage unit (e.g., database, data or other repositories, queue, etc.). The data transmitted between entities may include any desired format and arrangement, and may include any quantity of any types of fields of any size to store the data. The definition and data model for any datasets may indicate the overall structure in any desired fashion (e.g., computer-related languages, graphical representation, listing, etc.).

The environment of the present embodiments may include any number of computer, compute node, or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, etc.). The computer or other processing systems employed by the present embodiments may be implemented by any number of any personal or other type of computer or processing system (e.g., desktop, laptop, PDA, mobile devices, etc.), and may include any commercially available operating system and any combination of commercially available and custom software (e.g., machine learning software, etc.). These systems may include any types of monitors and input devices (e.g., keyboard, mouse, voice recognition, etc.) to enter and/or view information.

Note that in certain example implementations, operations as outlined herein may be implemented by logic encoded in one or more tangible media, which may be inclusive of non-transitory tangible media and/or non-transitory computer readable storage media (e.g., embedded logic provided in an application specific integrated circuit (ASIC), in digital signal processing (DSP) instructions, software [potentially inclusive of object code and source code] to be executed by a processor, or other similar machine, etc.). In some of these instances, a memory element or storage can store data used for operations described herein. This includes memory elements or storage being able to store software, logic, code, and/or processor instructions that are executed to carry out operations described herein. A processor (e.g., a hardware processor) can execute any type of instructions associated with data to achieve the operations detailed herein. In one example, a processor may transform an element or an article (e.g., data, information) from one state or thing to another state or thing. In another example, operations outlined herein may be implemented with logic, which can include fixed logic, hardware logic, programmable logic, digital logic, etc. (e.g., software/computer instructions executed by a processor) and the elements identified herein could be some type of a programmable processor, programmable digital logic (e.g., a field programmable gate array (FPGA), a DSP processor, an EPROM, a controller, an electrically erasable PROM (EEPROM), or an ASIC that includes digital logic, software, code, electronic instructions, or any suitable combination thereof.

In one example implementation, a compute node can encompass network appliances, routers, servers, switches, gateways, bridges, load balancers, firewalls, processors, modules, or any other suitable device, component, element, or object operable to exchange information that facilitates or otherwise helps to facilitate various operations as described for various embodiments discussed herein in a network environment (e.g., for mobile networks such as those illustrated in FIG. 1).

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

Nodes, elements, servers, entities, apparatuses, etc. discussed for various embodiments described herein can couple to one another through simple interfaces (as illustrated) and/or through any other suitable connection (wired or wireless), which provides a viable pathway for network communications. As referred to herein, a physical (wired or wireless) interconnection or interface can refer to an interconnection of one element with one or more other element(s), while a logical interconnection or interface can refer to communications, interactions and/or operations of elements with each other, which can be directly or indirectly interconnected, in a network environment. Additionally, any one or more of the elements and/or systems may be combined or removed from a given deployment based on a particular configuration and/or implementation.

In various embodiments, mobile network 100 may implement user datagram protocol/Internet Protocol (UDP/IP) connections and/or transmission control protocol/IP (TCP/IP) communication language protocol in particular embodiments of the present disclosure. However, mobile network 100 can alternatively implement any other suitable communication protocol, interface and/or standard, proprietary and/ or non-proprietary, for transmitting and receiving messaging and/or signaling. Other protocols, interfaces and/or communication standards that can be used in mobile network 100 can include 3GPP Diameter-based protocols, Remote Authentication Dial-In User Service (RADIUS) protocols, HSS/AAA signaling, a Terminal Access controller access-control system (TACACS), TACACS+, Proxy Mobile IP version 6 (PMIPv6), Proxy Mobile IP version 4 (PMIPv4), Extensible Messaging and Presence Protocol (XMPP), General Packet Radio Service (GPRS) Tunneling Protocol (GTP) (version 1 or version 2), Generic Route Encapsulation (GRE), Ethernet over GRE (EoGRE). In various embodiments, HSS/AAA signaling can include signaling exchanges facilitated via Diameter, RADIUS, Extensible Messaging and Presence Protocol (XMPP), Simple Object Access Protocol (SOAP), SOAP over Hypertext Transfer Protocol (HTTP), Representational State Transfer (REST), combinations thereof or the like. In some embodiments, secure communications can be facilitated using TCP/IP Secure Sockets Layer (SSL) communications.

In various embodiments, mobile network 100 can represent a series of points or elements of interconnected communication paths (wired or wireless) for receiving and transmitting packets of information that propagate through mobile network 100. In various embodiments, mobile network 100 can be associated with and/or provided by a single network operator or service provider and/or multiple network operators or service providers. In various embodiments, mobile network 100 can include and/or overlap with, in whole or in part, one or more packet data network(s). Mobile network 100 may offer communicative interfaces between various elements of mobile network 100 and may be associated with any local area network (LAN), wireless local area network (WLAN), metropolitan area network (MAN), wide area network (WAN), virtual private network (VPN), Radio Access Network (RAN), virtual local area network (VLAN), enterprise network, Intranet, extranet, or any other appropriate architecture or system that facilitates communications in a network environment A communication system, such as mobile network 100, through which communications propagate in can use any suitable technologies for communication including wireless (e.g., 3G/4G/5G/NG network, Institute of Electrical and Electronics Engineers (IEEE) Standard 802.11™-2012, published Mar. 29, 2012 (e.g., WiFi), WiMax, IEEE Standard 802.16™-2012, published Aug. 17, 2012, Radio-frequency Identification (RFID), Near Field Communication (NFC), Bluetooth™, etc.) and/or wired (e.g., T1 lines, T3 lines, digital subscriber lines (DSL), Ethernet, etc.) communication. Generally, any suitable means of communication may be used such as electric, sound, light, infrared, and/or radio.

Note that in this disclosure, references to various features (e.g., elements, structures, nodes, modules, components, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic, or the like as used herein this Specification, can be inclusive of an executable file comprising instructions that can be understood and processed on a computer, processor, machine, compute node, combinations thereof, or the like and may further include library modules loaded during execution, object files, system files, hardware logic, software logic, and/or any other executable modules.

The embodiments presented may be implemented in various forms, such as a system, a method, and/or a computer program product at any possible technical detail level of integration. The computer program product may include a non-transitory computer readable storage medium (or media) having computer readable program instructions thereon for causing a processor to carry out aspects of operations presented herein.

It is also important to note that the operations and steps described with reference to the preceding figures illustrate only some of the possible scenarios that may be executed by, or within, a communication system (e.g., mobile network 100). Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Note that with the examples provided above, as well as numerous other examples provided herein, interactions may be described in terms of one, two, three, or four elements. However, this has been done for purposes of clarity and example only. In certain cases, it may be easier to describe one or more of the functionalities by only referencing a limited number of network elements. It should be appreciated that networks discussed herein (and their teachings) are readily scalable and can accommodate a large number of components, as well as more complicated/sophisticated arrangements and configurations. Accordingly, the examples provided should not limit the scope or inhibit the broad teachings of networks discussed herein as potentially applied to a myriad of other architectures.

As used herein, unless expressly stated to the contrary, use of the phrase 'at least one of', 'one or more of', 'and/or', variations thereof, or the like are open ended expressions that are both conjunctive and disjunctive in operation for any combination of named elements, conditions, or activities. For example, each of the expressions 'at least one of X, Y and Z', 'at least one of X, Y or Z', 'one or more of X, Y and Z', 'one or more of X, Y or Z' and 'A, B and/or C' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z. Additionally, unless expressly stated to the contrary, the terms 'first', 'second', 'third', etc., are intended to distinguish the particular nouns (e.g., element, condition, node, module, activity, operation, etc.) they modify. Unless expressly stated to the contrary, the use of these terms is not intended to indicate any type of order, rank, importance, temporal sequence, or hierarchy of the modified noun. For example, 'first X' and 'second X' are intended to designate two X elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain protocols, networks discussed herein may be applicable to other exchanges or routing protocols, interfaces, and/or communications standards, proprietary and/or non-proprietary. Moreover, although networks described herein have been illustrated with reference to particular elements and operations that facilitate processes, these elements, and operations may be replaced by any suitable architecture or process that achieves the intended functionality of networks described herein.

What is claimed is:

1. A method comprising:
   determining, by an evolved packet data gateway, whether a user equipment (UE) is capable to connect to at least one of a standalone mobile core network and a non-standalone mobile core network;
   determining, by the evolved packet data gateway, whether the UE is subscribed to connect to at least one of the standalone mobile core network and the non-standalone mobile core network based on subscription information for the UE obtained by the evolved packet data gateway;
   obtaining, by the evolved packet data gateway from a domain name system (DNS) server, a list identifying a plurality of packet data network gateways that provide session connectivity for an access point name, wherein each packet data network gateway identified in the list includes a service parameter indicating a network capability; and
   selecting, by the evolved packet data gateway, a packet data network gateway of the plurality of packet data network gateways in the list to support a connection for the UE, wherein the selecting includes performing an ordered selection process that includes performing a comparison between the service parameter for each of the plurality of packet data network gateways in the list to a predetermined order of packet data network gateway service parameters, wherein the predetermined order of the packet data network gateway service parameters for performing the comparison is based on determining whether the UE is capable and is subscribed to connect to at least one of the standalone mobile core network and the non-standalone mobile core network and the ordered selection process is stopped upon a service parameter for a particular packet data network gateway of the plurality of packet data network gateways matching a packet data network gateway service parameter of the predetermined order.

2. The method of claim 1, wherein determining, by the evolved packet data gateway, whether the UE is capable to connect to at least one of the standalone mobile core network and the non-standalone mobile core network further comprises:
   receiving, by the evolved packet data gateway, network capability information for the UE in an Internet Key Exchange version 2 (IKEv2) message, wherein the network capability information for the UE identifies whether the UE is capable to connect to at least one of the standalone mobile core network and the non-standalone mobile core network.

3. The method of claim 2, wherein the network capability information for the UE is determined from a notify payload of the IKEv2 message.

4. The method of claim 3, wherein the network capability information is determined from two bits of a notification data field of the notify payload that identify whether the UE is capable to connect to at least one of the standalone mobile core network and the non-standalone mobile core network.

5. The method of claim 1, wherein determining, by the evolved packet data gateway, whether the UE is subscribed to connect to at least one of the standalone mobile core network and the non-standalone mobile core network further comprises:
   performing authentication of the UE with an authentication server to obtain the subscription information for the UE by the evolved packet data gateway from the authentication server.

6. The method of claim 5, wherein the subscription information for the UE obtained by the evolved packet data gateway from the authentication server is included in an attribute-value-pair comprising a data field that identifies whether the UE is subscribed to connect to at least one of the standalone mobile core network and the non-standalone mobile core network.

7. The method of claim 1, wherein the obtaining further comprises:
   sending, by the evolved packet data gateway, a query to the DNS server to obtain the list identifying the plurality of packet data network gateways that provide session connectivity for the access point name.

8. The method of claim 1, wherein the service parameter for each packet data network gateway of the plurality of packet data network gateways indicates one of:
   a 5G standalone mobile core network capability;
   a 5G non-standalone mobile core network capability;
   a 5G standalone and a 5G non-standalone mobile core network capability; and
   no 5G standalone nor 5G non-standalone mobile core network capability.

9. The method of claim 8, wherein based on a determination that the UE is capable and is subscribed to connect to both the standalone mobile core network and the non-standalone mobile core network, the selected packet data network gateway has at least one of the 5G standalone mobile core network capability and the 5G non-standalone mobile core network capability.

10. One or more non-transitory computer readable storage media encoded with instructions that, when executed by a processor, cause the processor to perform operations, comprising:
    determining, by an evolved packet data gateway, whether a user equipment (UE) is capable to connect to at least one of a standalone mobile core network and a non-standalone mobile core network;
    determining, by the evolved packet data gateway, whether the UE is subscribed to connect to at least one of the standalone mobile core network and the non-standalone mobile core network based on subscription information for the UE obtained by the evolved packet data gateway;
    obtaining, by the evolved packet data gateway from a domain name system (DNS) server, a list identifying a plurality of packet data network gateways that provide session connectivity for an access point name, wherein each packet data network gateway identified in the list includes a service parameter indicating a network capability; and
    selecting, by the evolved packet data gateway, a packet data network gateway of the plurality of packet data network gateways in the list to support a connection for the UE, wherein the selecting includes performing an ordered selection process that includes performing a comparison between the service parameter for each of the plurality of packet data network gateways in the list to a predetermined order of packet data network gateway service parameters, wherein the predetermined order of the packet data network gateway service parameters for performing the comparison is based on determining whether the UE is capable and is subscribed to connect to at least one of the standalone mobile core network and the non-standalone mobile core network and the ordered selection process is stopped upon a service parameter for a particular packet data network gateway of the plurality of packet data network gateways matching a packet data network gateway service parameter of the predetermined order.

11. The media of claim 10, wherein determining, by the evolved packet data gateway, whether the UE is capable to connect to at least one of the standalone mobile core network and the non-standalone mobile core network further comprises:
  receiving, by the evolved packet data gateway, network capability information for the UE in an Internet Key Exchange version 2 (IKEv2) message, wherein the network capability information for the UE identifies whether the UE is capable to connect to at least one of the standalone mobile core network and the non-standalone mobile core network.

12. The media of claim 10, wherein the obtaining further comprises:
  sending, by the evolved packet data gateway, a query to the DNS server to obtain the list identifying the plurality of packet data network gateways that provide session connectivity for the access point name.

13. The media of claim 10, wherein the service parameter for each packet data network gateway of the plurality of packet data network gateways indicates one of:
  a 5G standalone network capability;
  a 5G non-standalone network capability;
  a 5G standalone and a 5G non-standalone network capability; and
  no 5G standalone nor 5G non-standalone network capability.

14. An evolved packet data gateway comprising:
  at least one memory element for storing data; and
  at least one processor for executing instructions associated with the data, wherein executing the instructions causes the evolved packet data gateway to perform operations, comprising:
    determining whether a user equipment (UE) is capable to connect to at least one of a standalone mobile core network and a non-standalone mobile core network;
    determining whether the UE is subscribed to connect to at least one of the standalone mobile core network and the non-standalone mobile core network based on subscription information for the UE obtained by the evolved packet data gateway;
    obtaining, by the evolved packet data gateway from a domain name system (DNS) server, a list identifying a plurality of packet data network gateways that provide session connectivity for an access point name, wherein each packet data network gateway identified in the list includes a service parameter indicating a network capability; and
    selecting a packet data network gateway of the plurality of packet data network gateways in the list to support a connection for the UE, wherein the selecting includes performing an ordered selection process that includes performing a comparison between the service parameter for each of the plurality of packet data network gateways in the list to a predetermined order of packet data network gateway service parameters, wherein the predetermined order of the packet data network gateway service parameters for performing the comparison is based on determining whether the UE is capable and is subscribed to connect to at least one of the standalone mobile core network and the non-standalone mobile core network and the ordered selection process is stopped upon a service parameter for a particular packet data network gateway of the plurality of packet data network gateways matching a packet data network gateway service parameter of the predetermined order.

15. The evolved packet data gateway of claim 14, wherein determining whether the UE is capable to connect to at least one of the standalone mobile core network and the non-standalone mobile core network further comprises:
  receiving network capability information for the UE in an Internet Key Exchange version 2 (IKEv2) message, wherein the network capability information for the UE identifies whether the UE is capable to connect to at least one of the standalone mobile core network and the non-standalone mobile core network.

16. The evolved packet data gateway of claim 15, wherein the network capability information for the UE is determined from a notify payload of the IKEv2 message.

17. The evolved packet data gateway of claim 14, wherein determining whether the UE is allowed to connect to at least one of the standalone mobile core network and the non-standalone mobile core network further comprises:
  performing authentication of the UE with an authentication server to obtain the subscription information for the UE by the evolved packet data gateway from the authentication server.

18. The evolved packet data gateway of claim 17, wherein the subscription information for the UE obtained by the evolved packet data gateway from the authentication server is included in an attribute-value-pair comprising a data field that identifies whether the UE is subscribed to connect to at least one of the standalone mobile core network and the non-standalone mobile core network.

19. The evolved packet data gateway of claim 14, wherein the obtaining further comprises:
  sending a query to the DNS server to obtain the list identifying the plurality of packet data network gateways that provide session connectivity for the access point name.

20. The evolved packet data gateway of claim 14, wherein based on a determination that the UE is capable and is subscribed to connect to both the standalone mobile core network and the non-standalone mobile core network, the selected packet data network gateway has at least one of a 5G standalone mobile core network capability and a 5G non-standalone mobile core network capability.

* * * * *